(12) United States Patent
Hirai et al.

(10) Patent No.: US 7,864,267 B2
(45) Date of Patent: Jan. 4, 2011

(54) OPTICAL SHEET AND DISPLAY UNIT

(75) Inventors: Noriyuki Hirai, Miyagi (JP); Akihiro Horii, Miyagi (JP); Hiroshi Mizuno, Miyagi (JP); Kei Obata, Miyagi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 12/061,433

(22) Filed: Apr. 2, 2008

(65) Prior Publication Data
US 2008/0239200 A1    Oct. 2, 2008

(30) Foreign Application Priority Data
Apr. 2, 2007    (JP)    ............... 2007-096652

(51) Int. Cl.
G02F 1/1335    (2006.01)
G02F 1/13357   (2006.01)
F21V 5/04      (2006.01)

(52) U.S. Cl. ............... 349/65; 349/62; 362/339
(58) Field of Classification Search .............. 349/65
See application file for complete search history.

(56) References Cited

U.S. PATENT DOCUMENTS

| 6,091,547 | A  | * | 7/2000  | Gardiner et al. | 359/625 |
| 6,280,063 | B1 |   | 8/2001  | Fong et al.     |         |
| 6,811,274 | B2 | * | 11/2004 | Olczak          | 362/606 |
| 7,618,164 | B2 | * | 11/2009 | Wang et al.     | 362/339 |
| 2006/0056166 | A1 | * | 3/2006  | Yeo et al.      | 362/19  |
| 2006/0072342 | A1 | * | 4/2006  | Kim et al.      | 362/620 |
| 2006/0138702 | A1 |   | 6/2006  | Biernath et al. |         |
| 2006/0141218 | A1 |   | 6/2006  | Biernath et al. |         |
| 2006/0141220 | A1 |   | 6/2006  | Merrill et al.  |         |
| 2006/0204720 | A1 |   | 9/2006  | Biernath et al. |         |
| 2006/0204744 | A1 | * | 9/2006  | Hiraishi et al. | 428/327 |
| 2006/0274244 | A1 |   | 12/2006 | Battiato et al. |         |
| 2008/0247192 | A1 | * | 10/2008 | Hoshi et al.    | 362/627 |
| 2009/0279020 | A1 | * | 11/2009 | Tanabe          | 349/65  |

FOREIGN PATENT DOCUMENTS

| JP | 03-158555 | 7/1991 |
| WO | 98/50806  | 4/2008 |

* cited by examiner

Primary Examiner—Michelle R Connelly Cushwa
(74) Attorney, Agent, or Firm—K&L Gates LLP

(57) ABSTRACT

An optical sheet capable of eliminating rapid lowering of the luminance view angle while minimizing the lowering amount of the front luminance, or while avoiding the lowering of the front luminance is provided. The optical sheet includes a first light transmissive film and a second light transmissive film. The first light transmissive film and the second light transmissive film are layered on each other, the first light transmissive film has a plurality of first convexes that extend in a given direction and are arranged in parallel in a direction crossing the given direction in-plane on the second light transmissive film side, and the second light transmissive film has a plurality of second convexes that are arranged in parallel in one direction and are arranged in parallel in a direction crossing the one direction in-plane on the first light transmissive film side, and has shape anisotropy and refractive index anisotropy in-plane.

8 Claims, 18 Drawing Sheets

STRETCHING DIRECTION

| EXAMPLE 1 | NOT STRETCHED (133) | STRETCHED (34) |
| --- | --- | --- |
| EXAMPLE 2 | STRETCHED (33) | STRETCHED (34) |
| COMPARATIVE EXAMPLE 1 | — | NOT STRETCHED (134) |
| COMPARATIVE EXAMPLE 2 | NOT STRETCHED (133) | — |
| COMPARATIVE EXAMPLE 3 | NOT STRETCHED (133) | NOT STRETCHED (134) |
| COMPARATIVE EXAMPLE 4 | — | STRETCHED (34) |
| COMPARATIVE EXAMPLE 5 | STRETCHED (33) | — |
| COMPARATIVE EXAMPLE 6 | STRETCHED (33) | NOT STRETCHED (134) |

|  | SRz (μm) | SRa (μm) | POLARIZED LIGHT N (%) | POLARIZED LIGHT A (%) | POLARIZED LIGHT B (%) | POLARIZING AXIS DIFFERENCE (%) |
|---|---|---|---|---|---|---|
| ANISOTROPIC DIFFUSION SHEET 34 | 8.14 | 1.15 | 40.4 | 35.9 | 51.0 | 15.1 |
| ANISOTROPIC DIFFUSION SHEET 134 | 12.89 | 1.67 | 56.6 | 58.6 | 58.8 | 0.2 |

FIG. 18

| | HIGHEST LUMINANCE (TO COMPARATIVE EXAMPLE 1) | ILLUMINANCE (TO COMPARATIVE EXAMPLE 1) |
|---|---|---|
| COMPARATIVE EXAMPLE 4 | 105% | 105% |
| COMPARATIVE EXAMPLE 1 | 100% | 100% |

| | HIGHEST LUMINANCE (TO COMPARATIVE EXAMPLE 3) | ILLUMINANCE (TO COMPARATIVE EXAMPLE 3) | CUTOFF LEVEL |
|---|---|---|---|
| EXAMPLE 1 | 109% | 108% | NOT RECOGNIZABLE |
| COMPARATIVE EXAMPLE 2 | 107% | 102% | RECOGNIZABLE |
| COMPARATIVE EXAMPLE 3 | 100% | 100% | NOT RECOGNIZABLE |

OPTICAL SHEET AND DISPLAY UNIT

CROSS REFERENCES TO RELATED APPLICATIONS

The present application claims priority to Japanese Patent Application JP 2007-096652 filed in the Japanese Patent Office on Apr. 2, 2007, the entire contents of which is being incorporated herein by reference.

BACKGROUND

The present application relates to an optical sheet having 2 pieces of light transmissive films and a display unit including the optical sheet.

In these years, cathode ray tubes (CRT) that were a mainstream of display units in the past have been replaced by liquid crystal display units, since the liquid crystal display units have advantages such as the low electrical power consumption, the space-saving feature, and the low cost.

There are several types of the liquid crystal display units when categorized by, for example, illumination methods in displaying images. As a representative example, a transmissive liquid crystal display unit that displays images by utilizing a light source arranged behind a liquid crystal panel is cited.

In such a display unit, it is extremely important to decrease the electrical power consumption and increase the display luminance in order to increase the commercial value of the display unit. Thus, it has been strongly aspired that the gain of the optical system provided between the liquid crystal panel and the light source is increased, while the electrical power consumption of the light source is kept low as much as possible.

For example, a technique that a prism sheet as a luminance enhancement film is provided between the liquid crystal panel and the light source has been disclosed. In the prism sheet, for example, a plurality of prisms in the shape of an isosceles triangle pole having an apex angle of 90 degrees are arranged in parallel on a resin film. The front luminance is improved by utilizing the light-focusing effect of the prisms. Further, in International Publication No. WO2006/071616, a technique that a prism sheet having the polarization split function is provided between the liquid crystal panel and the light source has been disclosed. In such a prism sheet, in addition to the light-focusing effect of the prisms, polarization split is performed on the inclined plane of the prisms by utilizing interface reflection due to the difference of critical angles, and thereby the front luminance is improved.

However, in the foregoing prism sheet, though the front luminance is improved, the luminance view angle that is called dark band, cutoff or the like is rapidly lowered. Thus, to avoid the rapid lowering of the luminance view angle, for example, one of the various diffusion sheets, which is publicly known, may be provided between the liquid crystal panel and the polarization split device. However, in this case, there is an issue that the front luminance is lowered by insertion of the diffusion sheet.

SUMMARY

In view of the foregoing, it is desirable to provide an optical sheet capable of eliminating the rapid lowering of the luminance view angle while minimizing the lowering amount of the front luminance as much as possible or without lowering the front luminance, and a display unit including the optical sheet.

According to an embodiment, there is provided an optical sheet including a first light transmissive film and a second light transmissive film that are layered on each other. The first light transmissive film has a plurality of first convexes that extend in a given direction and are arranged in parallel in a direction crossing the given direction in-plane on the second light transmissive film side. Further, the second light transmissive film has a plurality of second convexes that are arranged in parallel in one direction and are arranged in parallel in a direction crossing the one direction in-plane on the first light transmissive film side, and has shape anisotropy and refractive index anisotropy in-plane.

According to an embodiment, there is provided a display unit including a panel driven based on an image signal, a pair of polarizers sandwiching the display panel, a light source for illuminating the panel, and the optical sheet provided between the polarizer and the light source.

According to the optical sheet and the display unit of an embodiment, in the first light transmissive film, the plurality of first convexes extending in the given direction are one-dimensionally arranged in-plane on the second light transmissive film side. Thereby, the respective first convexes refract and transmit the component in the arrangement direction of the respective first convexes of light entering from the rear face side of the first light transmissive film to the normal line direction of the first light transmissive film, and improve the directivity. In the result, the front luminance is improved. Meanwhile, in the second light transmissive film, the plurality of second convexes are two-dimensionally arranged in-plane on the other side of the first light transmissive film, and has the shape anisotropy. Therefore, due to the shape anisotropy, anisotropy is generated in the haze degree. Further, the respective second convexes have the refractive index anisotropy. Therefore, the polarization component crossing the light transmission axis of the respective second concaves of light entering the second light transmissive film is reflected by the second light transmissive film. The reflected light becomes nonpolarized light to enter the second light transmissive film again. Such recycle is repeated, and thereby the light extraction efficiency is improved and the front luminance is improved.

According to the optical sheet and the display unit of an embodiment, in the first light transmissive film, the plurality of first convexes extending in the given direction are one-dimensionally arranged in-plane on the second light transmissive film side. In addition, in the second light transmissive film, the plurality of second convexes having the shape anisotropy and the refractive index anisotropy are two-dimensionally arranged in-plane on the other side of the first light transmissive film. Therefore, by appropriately adjusting the orientation of the axis of anisotropy of the haze degree resulting from the shape anisotropy of the respective second convexes and the magnitude of haze degree, the front luminance elevated in the first light transmissive film may be inhibited from being lowered in the second light transmissive film to the minimum, or such lowering may be eliminated. Further, rapid lowering of the luminance view angle may be suppressed due to the anisotropy of the haze degree resulting from the shape anisotropy of the respective second convexes. As described above, according to the optical sheet and the display unit of an embodiment, rapid lowering of the luminance view angle may be eliminated while the lowering amount of the front luminance is minimized, or while the lowering of the front luminance is prevented.

Additional features and advantages are described herein, and will be apparent from the following Detailed Description and the figures.

BRIEF DESCRIPTION OF THE FIGURES

FIG. 18 is a contrast diagram for explaining a haze degree of the anisotropic diffusion sheet before and after being stretched;

DETAILED DESCRIPTION

An embodiment will be hereinafter described in detail with reference to the drawings.

Figure 1:
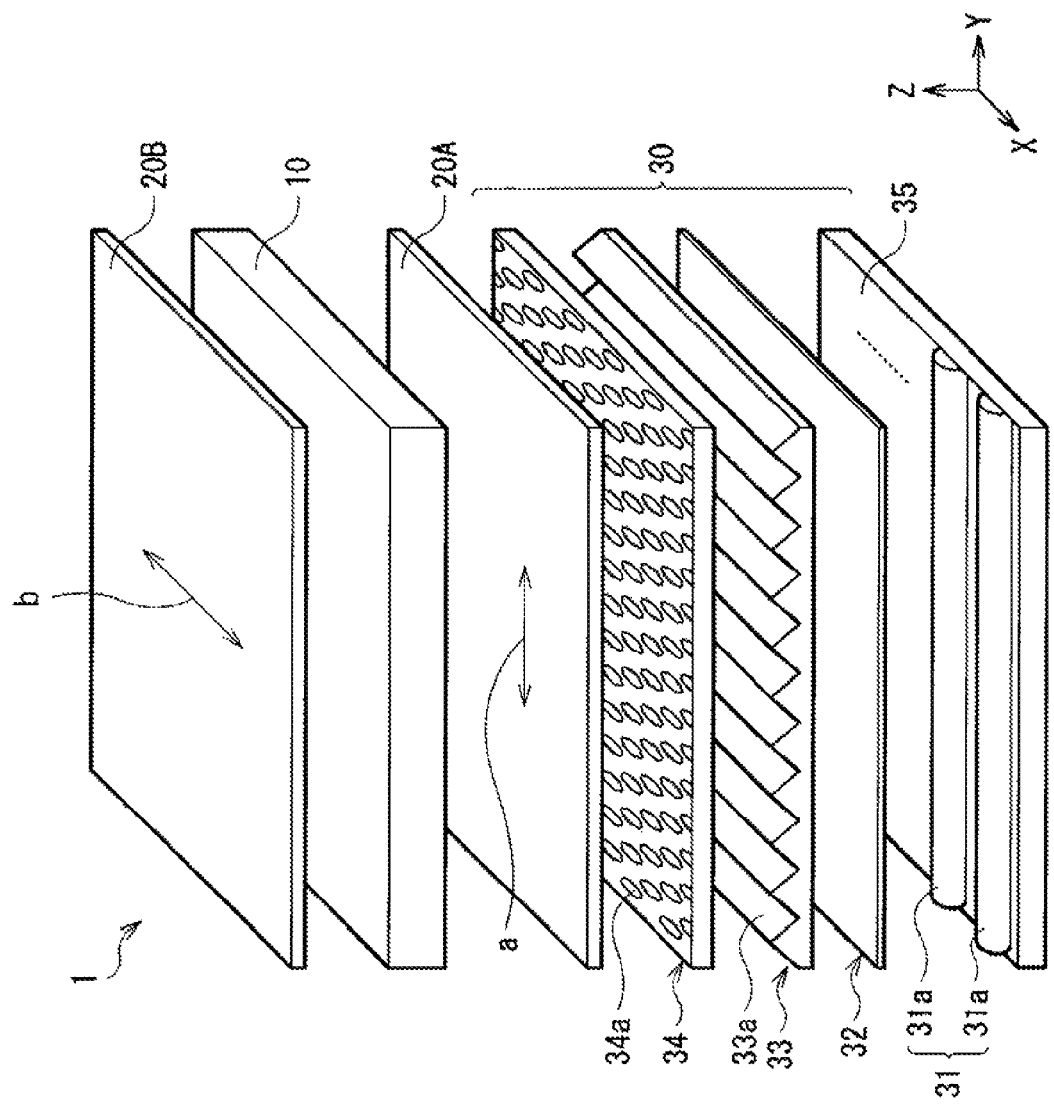
FIG. 1 is a development perspective view showing an example of a structure of a display unit according to an embodiment.

FIG. 1 shows a schematic structure of a display unit 1 according to an embodiment. The display unit 1 includes a liquid crystal display panel 10, a first polarizer 20A, a second polarizer 20B that sandwich the liquid crystal display panel 10, an illuminating device 30 arranged behind the first polarizer 20A, and a drive circuit (not shown) for displaying an image by driving the liquid crystal display panel 10. The front face of the second polarizer 20B is oriented to the observer side (not shown).

The liquid crystal display panel 10 is, for example, a transmissive display panel in which each pixel is driven according to an image signal. The liquid crystal display panel 10 has a structure in which a liquid crystal layer is sandwiched between a pair of transparent substrates. Specifically, the liquid crystal display panel 10 has the transparent substrate, a color filter, a transparent electrode, an alignment film, the liquid crystal layer, an alignment film, a transparent pixel electrode, and the transparent substrate sequentially from the observer side.

In general, the transparent substrate is a substrate transparent to visible light. On the transparent substrate on the illuminating device 30 side, an active drive circuit including a TFT (Thin Film Transistor) as a drive device electrically connected to the transparent pixel electrode, wiring and the like is formed. In the color filter, color filters for respectively separating light emitted from the illuminating device 30 into three primary colors of red (R), green (G), and blue (B) are arranged. The transparent electrode is made of, for example, ITO (Indium Tin Oxide), and functions as a common opposed electrode. The alignment film is made of, for example, a polymer material such as polyimide, and performs alignment for the liquid crystal. The liquid crystal layer is made of, for example, VA (Vertical Alignment) mode liquid crystal, TN (Twisted Nematic) mode liquid crystal, or STN (Super Twisted Nematic) mode liquid crystal. The liquid crystal layer has a function to transmit or block light emitted from the illuminating device 30 for every pixel by a voltage applied from a not-shown drive circuit. The transparent pixel electrode is made of, for example, ITO, and functions as an electrode for every pixel.

The first polarizer 20A is a polarizer arranged on the light incident side of the liquid crystal display panel 10. The second polarizer 20B is a polarizer arranged on the light emitting side of the liquid crystal display panel 10. The first polarizer 20A and the second polarizer 20B are a kind of optical shutter, and transmit only light (polarized light) in a specific oscillation direction. The first polarizer 20A and the second polarizer 20B are respectively arranged so that their polarizing axes are directed differently from each other by 90 degrees. Thereby, light emitted from the illuminating device 30 is transmitted through the liquid crystal layer or blocked by the liquid crystal layer.

The orientation of polarizing axis a of the first polarizer 20A is determined by a magnitude relation between the refractive index of an anisotropic diffusion sheet 34 in the extending direction of a convex 34a described later and the refractive index of the anisotropic diffusion sheet 34 in the direction orthogonal to the extending direction of the convex 34a. Specifically, the orientation of the polarizing axis a of the first polarizer 20A is set so that the refractive index of the anisotropic diffusion sheet 34 in the direction in parallel with the polarizing axis a is smaller than the refractive index of the anisotropic diffusion sheet 34 in the direction orthogonal to the polarizing axis a.

For example, in the case where the refractive index of the anisotropic diffusion sheet 34 in the direction orthogonal to the extending direction of the convex 34a is smaller than the refractive index of the anisotropic diffusion sheet 34 in the extending direction of the convex 34a, the orientation of the polarizing axis a of the first polarizer 20A is preferably aligned in the direction orthogonal to the extending direction of the convex 34a, as shown in FIG. 1. However, if it is difficult to align the polarizing axis a to the direction orthogonal to the extending direction of the convex 34a, because some other purposes such as obtaining an appropriate angle luminance distribution and improving the contract of the liquid crystal display panel 10, the angle made by the polarizing axis a and the direction orthogonal to the extending direction of the convex 34a may be increased. In this case, to improve the front luminance, it is necessary to set such an angle in the range from larger than 0 degree to smaller than 45 degrees, and more preferably in the range from larger than 0 degree to smaller than 20 degrees.

Meanwhile, in the case where the refractive index of the anisotropic diffusion sheet 34 in the extending direction of the convex 34a is smaller than the refractive index of the anisotropic diffusion sheet 34 in the direction orthogonal to the extending direction of the convex 34a, the orientation of the polarizing axis a of the first polarizer 20A is preferably aligned in the extending direction of the convex 34a. However, if it is difficult to align the polarizing axis a to the extending direction of the convex 34a because of the foregoing purposes, the angle made by the polarizing axis a and the extending direction of the convex 34a may be increased. In this case, to improve the front luminance, it is necessary to set such an angle in the range from larger than 0 degree to smaller than 45 degrees, and more preferably in the range from larger than 0 degree to smaller than 20 degrees.

The illuminating device 30 has a light source 31. For example, on the liquid crystal display panel 10 side of the light source 31, a diffusion sheet 32, a luminance enhancement film 33, and the anisotropic diffusion sheet 34 are arranged sequentially from the light source 31 side. Meanwhile, a reflective sheet 35 is arranged behind the light source 31. As described above, the illuminating device 30 in this embodiment is located immediately below the liquid crystal display panel, but may have, for example, an edge light structure using a light guide plate. An optical sheet composed of the luminance enhancement film 33 and the anisotropic diffusion sheet 34 corresponds to a specific example of "optical sheet" in the present application.

In the light source 31, a plurality of linear light sources 31a are arranged in parallel with an equal distance (for example, 20 mm). As the linear light source 31a, for example, a Hot Cathode Fluorescent Lamp (HCFL), a Cold Cathode Fluorescent Lamp (CCFL) or the like is cited. The light source 31 may be, for example, a light source in which point light sources such as a Light Emitting Diode (LED) are two-dimensionally arranged, or a surface light source such as an organic ElectroLuminescence (EL).

The reflective sheet 35 is, for example, a foamed PET (polyethyleneterephthalate), an evaporated silver film, a multilayer reflective film or the like. Part of light emitted from the light source 31 is reflected in the direction of the liquid crystal display panel 10. Thereby, light emitted from the light source 31 is effectively utilized.

The diffusion sheet 32 is, for example, a diffusion plate formed by distributing a diffusion material (filler) in a relatively thick plate-like transparent resin; a diffusion film formed by coating a relatively thin film-like transparent resin with a transparent resin (binder) containing a diffusion material; or a combination thereof. As the plate-like or film-like transparent resin, for example, PET, acryl, polycarbonate or the like is used. As the diffusion material, for example, an inorganic filler such as $SiO_2$, an organic filler such as acryl or the like is used.

Figure 2:
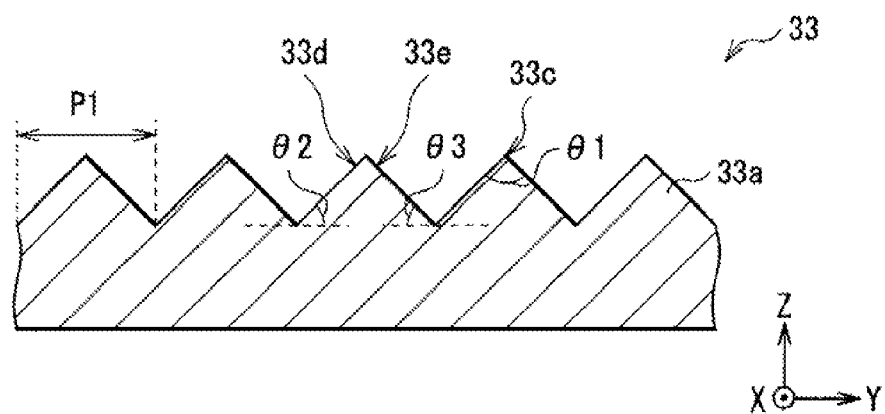
FIG. 2 is a cross section showing an example of a structure of a luminance enhancement film of FIG. 1.

The luminance enhancement film 33 is made of, for example, a resin material having the translucency. The luminance enhancement film 33 is arranged so that a face including the luminance enhancement film 33 is in parallel with the front face of the liquid crystal display panel 10. On the face (front face) on the light emitting side of the luminance enhancement film 33, as shown in FIG. 2, a plurality of columnar convexes 33a extend in one direction in-plane on the light emitting side, and are sequentially arranged in the direction perpendicular to the extending direction. Meanwhile, the face (rear face) on the light incident side of the luminance enhancement film 33 is, for example, a plane face. FIG. 2 is a cross section showing an enlarged cross section example of the luminance enhancement film 33.

For example, as shown in FIG. 2, each convex 33a is in the shape of a triangle pole having inclined faces 33d and 33e contacting with a top 33c having apex angle θ1. The inclined faces 33d and 33e are arranged diagonally opposed to the face including the luminance enhancement film 33 at base angles of θ2 and θ3. A width in the arrangement direction of each convex 33a (pitch P1) is, for example, in the range from 10 μm to 350 μm. Each convex 33a is not limited to the shape of a triangle pole as shown in FIG. 2. For example, each convex 33a may be in the shape of a polygonal pole such as a pentagonal pole. Otherwise, each convex 33a may have a curved face shape (for example, cylindrical shape) such as an oval shape and an aspheric shape in the direction orthogonal to the extending direction of each convex 33a.

Further, each convex 33a does not necessarily have the same shape and the same size as those of other convexes 33a. For example, a pair of space structure composed of two adjacent convexes 33a having an identical shape in which one convex 33a is high (large) and the other is low (small) may be arranged at an equal pitch in the arrangement direction. Otherwise, for example, a pair of space structure composed of two adjacent convexes 33a having an identical height and a different shape may be arranged at an equal pitch in the arrangement direction. Otherwise, for example, a pair of space structure composed of two adjacent convexes 33a having a different shape and a different size (height) may be arranged at an equal pitch in the arrangement direction. It is also possible to provide a plurality of convexes and concaves in the extending direction of each convex 33a.

Thereby, each convex 33a refracts and transmits the component in the arrangement direction of each convex 33a of the light entering from the rear face side of the luminance enhancement film 33 toward the direction orthogonal to the liquid crystal display panel 10 to improve directivity. In each convex 33a, light focusing effect due to refraction effect by each convex 33a is little for the component in the extending direction of each convex 33a of the light entering from the rear face side of the luminance enhancement film 33.

Figure 3A:
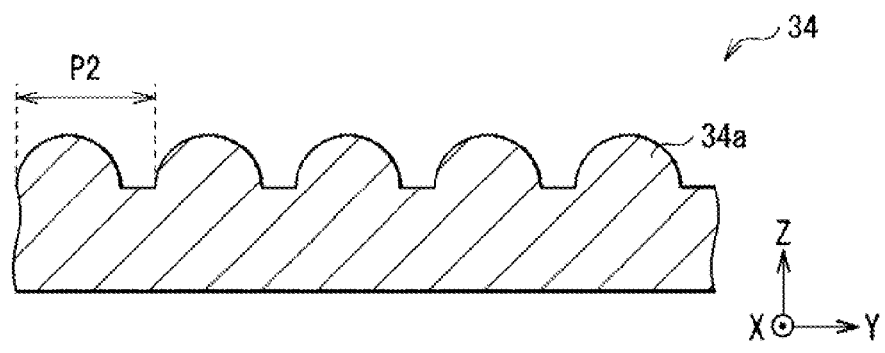
FIGS. 3A and 3B are respectively a cross section and a front face view showing an example of a structure of an anisotropic diffusion sheet of FIG. 1.

The anisotropic diffusion sheet 34 is made of, for example, a resin material having the translucency. The anisotropic diffusion sheet 34 is arranged so that a face including the anisotropic diffusion sheet 34 is in parallel with the front face of the liquid crystal display panel 10. On the face (front face) on the light emitting side of the luminance enhancement film 33, for example, as shown in FIG. 3A, the plurality of convexes 34a extend and are arranged in parallel in one direction in a plane face in parallel with a face including the anisotropic diffusion sheet 34, and are also arranged in parallel in the direction crossing the extending direction. Meanwhile, the face (rear face) on the light incident side of the anisotropic diffusion sheet 34 is, for example, a plane face. It is also possible that the foregoing plurality of convexes 34a are formed on the face (rear face) on the light incident side of the anisotropic diffusion sheet 34, and the face (front face) on the light emitting side is a plane face.

It is preferable that the extending direction of the convex 34a and the extending direction of each convex 33a are oriented in the identical direction. That is, it is preferable that the axis of the shape anisotropy of the convex 34a is in parallel with (or almost in parallel with) the axis of the shape anisotropy of the convex 33a. FIG. 3A is a cross section showing an enlarged cross section example of the anisotropic diffusion sheet 34, and FIG. 3B is a plan view schematically showing the front face of the anisotropic diffusion sheet 34.

Figure 3B:
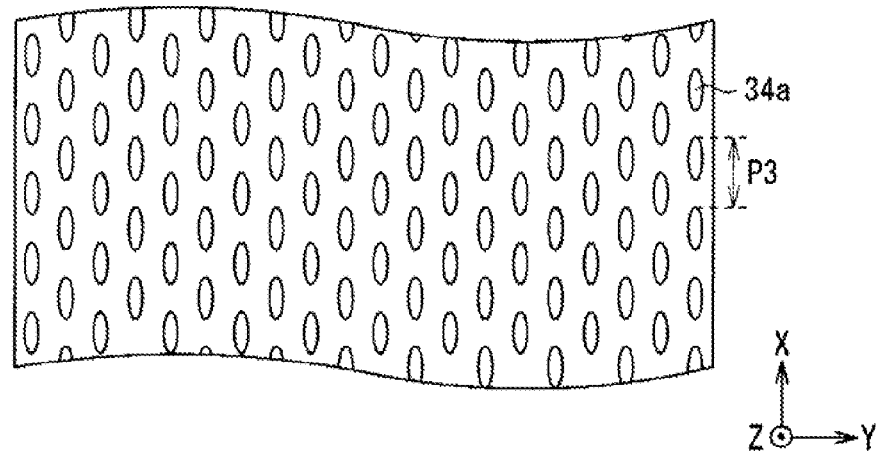

For example, as shown in FIGS. 3A and 3B, each convex 34a extends in the direction almost in parallel with the extending direction of the convex 33a. The convex 34a is in the columnar shape in which the length in the extending direction of each convex 34a is shorter than the length in the extending direction of the convex 33a. A width (pitch P2) in the direction orthogonal to the extending direction of each convex 34a, a width (pitch P3) in the extending direction of each convex 34a, the shape of each convex 34a, the number of the convexes 34a, the haze value of each convex 34a and the like are set as appropriate according to the intended purpose. Each convex 34a is not necessarily arranged regularly, but may be arranged at random.

Each convex 34a may have a curved face shape (for example, cylindrical shape) such as an oval shape and an aspheric shape in the direction perpendicular to the extending direction of each convex 33a as shown in FIGS. 3A and 3B. Each convex 34a may be in the shape of a polygonal pole having at least one plane faces in the direction orthogonal to the extending direction of each convex 33a.

Further, each convex 34a does not necessarily have the same shape and the same size as those of other convexes 34a. For example, a pair of space structure composed of two adjacent convexes 34a having an identical shape in which one convex 34a is high (large) and the other is low (small) may be arranged at an equal pitch in the direction orthogonal to the extending direction of each convex 34a. Otherwise, for example, a pair of space structure composed of two adjacent convexes 34a having an identical height and a different shape may be arranged at an equal pitch in the direction orthogonal to the extending direction of each convex 34a. Otherwise, for example, a pair of space structure composed of two adjacent convexes 34a having a different shape and a different size (height) may be arranged at an equal pitch in the direction orthogonal to the extending direction of each convex 34a. It is also possible to provide a plurality of convexes and concaves in the extending direction of each convex 34a.

Thereby, each convex 34a refracts and transmits the component in the direction orthogonal to the extending direction of each convex 34a of the light entering the rear face side of the anisotropic diffusion sheet 34 in the direction in parallel with the liquid crystal display panel 10 to modify the directivity. In each convex 34a, diffusion effect due to refracting effect by each convex 34a is little for the component in the extending direction of each convex 34a of the light entering from the rear face side of the anisotropic diffusion sheet 34. That is, in each convex 34a, anisotropy is generated in the haze degree resulting from the shape anisotropy of each convex 34a.

In this embodiment, at least each convex 34a out of each convex 33a and each convex 34a has the refractive index anisotropy in-plane. For example, in the case where each convex 34a has the refractive index anisotropy in-plane, the refractive index in the extending direction of each convex 34a is different from that in the arrangement direction of each convex 34a. Further, for example, in the case where each convex 33a has the refractive index anisotropy in-plane, the refractive index in the extending direction of each convex 33a is different from that in the arrangement direction of each convex 33a.

However, in the case where both each convex 33a and each convex 34a have the refractive index anisotropy in-plane, magnitude relation between the refractive index of each convex 33a in the extending direction in each convex 33a and the refractive index of each convex 33a in the arrangement direction in each convex 33a is equal to the magnitude relation between the refractive index of each convex 34a in the extending direction in each convex 34a and the refractive index of each convex 34a in the arrangement direction in each convex 34a. That is, at least each convex 34a out of each convex 33a and each convex 34a has the refractive index anisotropy in-plane so that the refractive index in the direction in parallel with the polarizing axis a is smaller than the refractive index in the direction orthogonal to the polarizing axis a.

As above, in this embodiment, at least each convex 34a out of each convex 33a and each convex 34a has the refractive index anisotropy in-plane so that the refractive index in the direction in parallel with the polarizing axis a is smaller than the refractive index in the direction orthogonal to the polarizing axis a. Thus, more light is reflected in the direction orthogonal to the polarizing axis a, return light is recycled, and thereby light in the direction in parallel with the polarizing axis a may be increased. Therefore, transmissive characteristics of light entering the luminance enhancement film 33 and the anisotropic diffusion sheet 34 may be changed according to polarization state. In the case where each convex 34a has the refractive index anisotropy, the recycle efficiency is better in case of providing each convex 34a on the light emitting side (front face), than the case providing each convex 34a on the light incident side (rear face).

The in-plane anisotropy of the refractive index can be expressed by stretching a sheet containing a semicrystalline or crystalline resin in one direction. The semicrystalline or crystalline resin includes a resin in which the refractive index in the stretch direction is larger than the refractive index in the direction orthogonal to the stretch direction, a resin in which the refractive index in the stretch direction is smaller than the refractive index in the direction orthogonal to the stretch direction and the like. As a material showing the positive birefringence in which the refractive index in the stretch direction becomes large, for example, PET (polyethyleneterephthalate), PEN (polyethylenenaphthalate) and a mixture thereof, or a copolymer such as PET-PEN copolymer, polycarbonate, polyvinyl alcohol, polyester, polyvinylidene fluoride, polypropylene, polyamide or the like is cited. Meanwhile, as a material showing the negative birefringence in which the refractive index in the stretch direction becomes small, for example, a methacryl resin, a polystyrene resin, a styrene-methylmethacrylate copolymer, a mixture thereof or the like is cited.

The in-plane anisotropy of the refractive index may be also occurred by, for example, using a crystal material having the refractive index anisotropy. Further, in terms of simplifying the manufacturing process, the entire luminance enhancement film 33 or the entire anisotropic diffusion sheet 34 is preferably made of an identical material. However, each convex 33a or each convex 34a may be made of a material different from that of other regions of the luminance enhancement film 33 or the anisotropic diffusion sheet 34.

Next, a description will be given of a function of the luminance enhancement film 33 in the case that in the entire luminance enhancement film 33, the refractive index in the extending direction of each convex 33a is different from that in the arrangement direction of each convex 33a.

Figure 4:
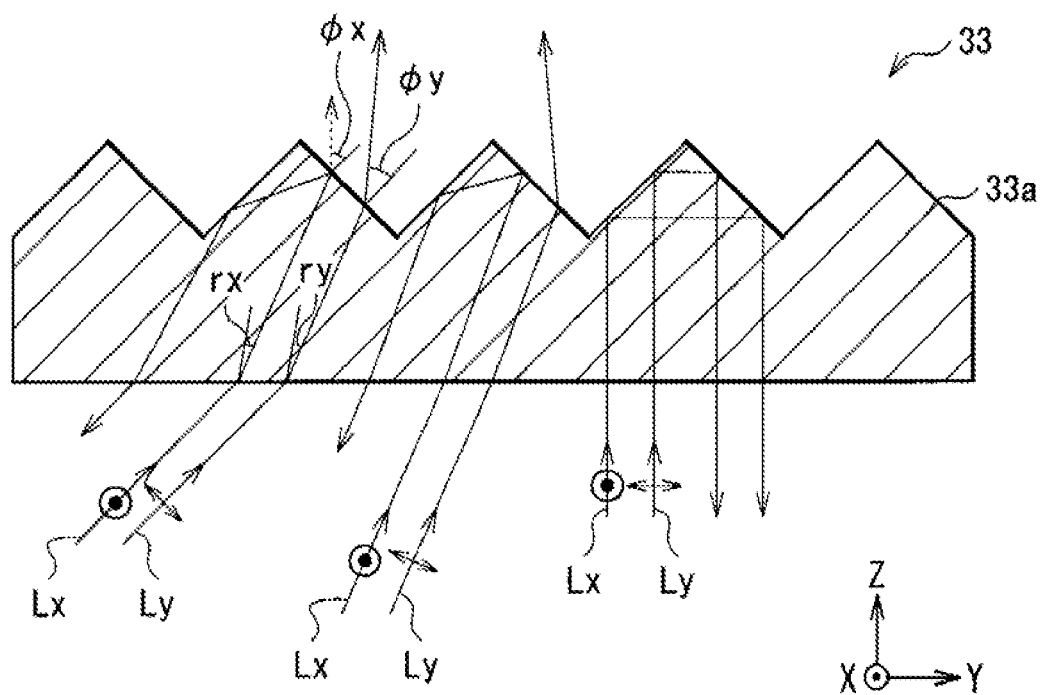
FIG. 4 is a characteristics diagram showing transmission characteristics of the luminance enhancement film of FIG. 1.

FIG. 4 shows an example of a light path when entering the light of the illuminating device 30 from the rear face of the luminance enhancement film 33, in the case that the entire luminance enhancement film 33 is made of a material in which refractive index nx in the extending direction of each convex 33a is larger than refractive index ny in the arrangement direction of each convex 33a (nx>ny). In FIG. 4, Lx represents a polarization component oscillating in the extending direction (X direction) of each convex 33a in the light of the illuminating device 30. Ly represents a polarization component oscillating in the arrangement direction (Y direction) of each convex 33a in the light of the illuminating device 30.

For the light of the illuminating device 30 entering from the diagonal direction to the face including the luminance enhancement film 33, the refractive index in the extending direction of each convex 33a is different from the refractive index in the arrangement direction of each convex 33a (nx>ny in FIG. 4). Thus, the polarization component Lx in X direction and the polarization component Ly in Y direction of the light of the illuminating device 30 are refracted on the rear face of the luminance enhancement film 33 at refractive angles rx and ry different from each other (rx<ry in FIG. 4), and are emitted from the front face of the luminance enhancement film 33 (light emitting face of each convex 33a) at exit angles φx and φy (φx>φy in FIG. 4) different from each other.

In the luminance enhancement film 33, the refractive index in the extending direction of each convex 33a is different from the refractive index in the arrangement direction of each convex 33a (nx>ny in FIG. 4). Thus, the respective polarization components oscillating in the respective directions are reflected by the interface such as the rear face of the luminance enhancement film 33 and the light emitting face of the convex 33a at reflectance different from each other. Therefore, as shown in FIG. 4, in the entire luminance enhancement film 33, in the case where the refractive index nx in the extending direction of each convex 33a is larger than the refractive index ny in the arrangement direction of each convex 33a (Case A), the reflection amount of Lx becomes larger than the reflection amount of Ly. Thus, in the light passing through the luminance enhancement film 33, the light amount of Ly becomes larger than the light amount of Lx. On the contrary, in the entire luminance enhancement film 33, in the case where the refractive index ny in the arrangement direction of each convex 33a is larger than the refractive index nx in the extending direction of each convex 33a (Case B), the reflection amount of Ly becomes larger than the reflection amount of Lx. Thus, in the light passing through the luminance enhancement film 33, the light amount of Lx becomes larger than the light amount of Ly.

In the luminance enhancement film 33, the refractive index in the extending direction of each convex 33a is different from the refractive index in the arrangement direction of each convex 33a (nx>ny in FIG. 4). Thus, the respective polarization components oscillating in the respective directions have a critical angle different from each other on the interface such as the rear face of the luminance enhancement film 33 and the light incident face of the convex 33a. Therefore, in the case of Case A, as shown in the central part of FIG. 4, for light entering at a certain incident angle, if the angle at which the light enters the emitting face is larger than the critical angle of Lx and smaller than the critical angle of Ly on the light emitting face, Lx is totally reflected and Ly is transmitted. Therefore, the polarization component Lx is repeatedly reflected totally by the light emitting face of each convex 33a to become return light, and only the polarization component Ly passes through the light emitting face of each convex 33a to realize a complete polarization split state. On the contrary, in the case of Case B, for light entering at a certain incident angle, if the angle at which the light enters the emitting face is larger than the critical angle of Ly and smaller than the critical angle of Lx on the light emitting face, Ly is totally reflected and Lx is transmitted. Therefore, the polarization component Ly is repeatedly reflected totally by the light emitting face of each convex 33a to become return light, and only the polarization component Lx passes through the light emitting face of each convex 33a to realize a complete polarization split state.

Further, if the incident angle of light of the illuminating device 30 to the light emitting face of each convex 33a is excessively large, in both Case A and Case B, as shown in the right side of FIG. 4, the light of the illuminating device 30 is repeatedly reflected totally by the light emitting face of each convex 33a to become return light back to the illuminating device 30 side regardless of the polarization state.

As described above, in the case where the entire luminance enhancement film 33 has the in-plane refractive index anisotropy, the luminance enhancement film 33 may obtain a certain polarization split effect in addition to light focusing effect of the illuminating device 30.

Next, a description will be given of a function of the anisotropic diffusion sheet 34 in the case that the refractive index in the extending direction of each convex 34a is different from that in the arrangement direction of each convex 34a in the entire anisotropic diffusion sheet 34.

Figure 5:
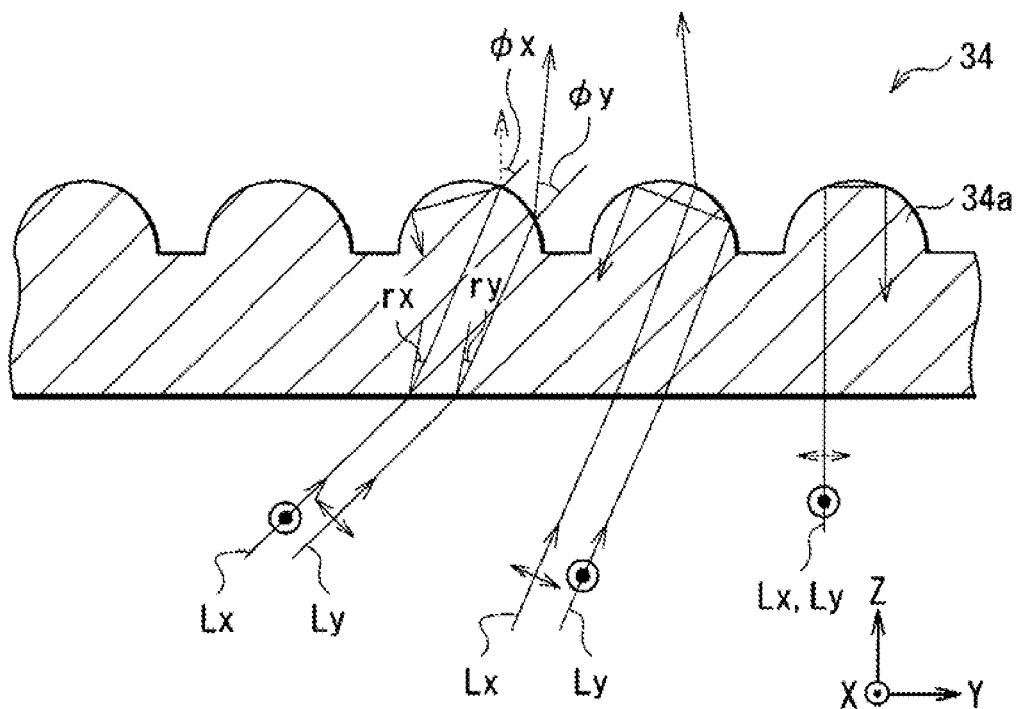
FIG. 5 is a characteristics diagram showing transmission characteristics of the anisotropic diffusion sheet of FIG. 1.

FIG. 5 shows an example of a light path when entering the light of the illuminating device 30 from the rear face of the luminance enhancement film 33, in the case that the entire anisotropic diffusion sheet 34 is made of a material in which refractive index nx in the extending direction of each convex 34a is larger than refractive index ny in the arrangement direction of each convex 34a (nx>ny). In FIG. 5, Lx represents a polarization component oscillating in the extending direction (X direction) of each convex 34a in the light of the illuminating device 30. Ly represents a polarization component oscillating in the arrangement direction (Y direction) of each convex 34a in the light of the illuminating device 30.

For the light of the illuminating device 30 entering from the diagonal direction to a face including the anisotropic diffusion sheet 34, the refractive index in the extending direction of each convex 34a is different from the refractive index in the arrangement direction of each convex 34a (nx>ny in FIG. 5). Thus, the polarization component Lx in X direction and the polarization component Ly in Y direction of the light of the illuminating device 30 are refracted at refractive angles rx and ry different from each other (rx<ry in FIG. 5) on the rear face of the anisotropic diffusion sheet 34 (light incident face of each convex 34a), and are emitted from the front face of the anisotropic diffusion sheet 34 at exit angles φx and φy (φx>φy in FIG. 5) different from each other.

In the anisotropic diffusion sheet 34, the refractive index in the extending direction of each convex 34a is different from the refractive index in the arrangement direction of each convex 34a (nx>ny in FIG. 5). Thus, the respective polarization components oscillating in the respective directions are reflected by the interface such as the front face and the rear face of the anisotropic diffusion sheet 34 at reflectance different from each other. Therefore, as shown in FIG. 5, in the entire anisotropic diffusion sheet 34, in the case where the refractive index nx in the extending direction of each convex 34*a* is larger than the refractive index ny in the arrangement direction of each convex 34*a* (Case C), the reflection amount of Lx becomes larger than the reflection amount of Ly. Thus, in the light passing through the anisotropic diffusion sheet 34, the light amount of Ly becomes larger than the light amount of Lx. On the contrary, in the entire anisotropic diffusion sheet 34, in the case where the refractive index ny in the arrangement direction of each convex 34*a* is larger than the refractive index nx in the extending direction of each convex 34*a* (Case D), the reflection amount of Ly becomes larger than the reflection amount of Lx. Thus, in the light passing through the anisotropic diffusion sheet 34, the light amount of Lx becomes larger than the light amount of Ly.

In the case of Case C, the exit angles of the respective polarization components Lx and Ly emitted from the front face of the anisotropic diffusion sheet 34 have a relation of φx>φy. Thus, if the incident angle of the light of the illuminating device 30 entering the anisotropic diffusion sheet 34 satisfies a specific condition, as shown in the central part of FIG. 5, the polarization component Lx is totally reflected by the surface of the anisotropic diffusion sheet 34 to become return light, and only the polarization component Ly passes through the front face of the anisotropic diffusion sheet 34 to realize a complete polarization split state. On the contrary, in the case of Case D, the exit angles of the respective polarization components Lx, Ly emitted from the front face of the anisotropic diffusion sheet 34 have a relation of φx<φy. Thus, if the incident angle of the light of the illuminating device 30 entering the anisotropic diffusion sheet 34 satisfies a specific condition, the polarization component Ly is totally reflected by the front face of the anisotropic diffusion sheet 34 to become return light, and only the polarization component Lx passes through the front face of the anisotropic diffusion sheet 34 to realize a complete polarization split state.

Further, if the incident angle of the light of the illuminating device 30 to the front face of the anisotropic diffusion sheet 34 is excessively large, in both Case C and Case D, as shown in the right side of FIG. 5, the light of the illuminating device 30 is reflected totally by the front face of the anisotropic diffusion sheet 34 to become return light back to the illuminating device 30 side regardless of polarization state.

As described above, in the case where the entire anisotropic diffusion sheet 34 or part thereof has the in-plane refractive index anisotropy, the anisotropic diffusion sheet 34 may obtain a certain polarization split effect in addition to the effect to diffuse the light of the illuminating device 30.

The light reflected by the front face or the rear face of the anisotropic diffusion sheet 34 is reflected by the front face of the reflection sheet 35 (FIG. 1) and the diffusion sheet 32 of the illuminating device 30, depolarized, and again enters the luminance enhancement film 33 and the anisotropic diffusion sheet 34. Thereby it is possible that a light amount of one polarization component (Ly in FIG. 5) is significantly larger than a light amount of the other polarization component (Lx in FIG. 5). In the result, light utilization efficiency is more improved and the front luminance is more improved than a case in which each convex 34*a* does not have the polarization split effect.

Further, in the case where the axis of the shape anisotropy of each convex 34*a* (in the extending direction) is in parallel with the axis of the refractive index anisotropy of each convex 33*a*, the axis of the anisotropy of the haze degree resulting from the shape anisotropy of each convex 34*a* becomes in parallel with the axis of the refractive index anisotropy of each convex 33*a*. Thereby, when light entering from the rear face side of the anisotropic diffusion sheet 34 passes through the anisotropic diffusion sheet 34, such light is not depolarized and is emitted from the anisotropic diffusion sheet 34. Thereby, by appropriately adjusting the size of haze degree, lowering amount of the front luminance elevation resulting from the refractive index anisotropy of each convex 33*a* due to the diffusion effect of each convex 34*a* may be minimized.

Further, in the case that each convex 34*a* of the anisotropic diffusion sheet 34 has the refractive index anisotropy, if the axis of the refractive index anisotropy of each convex 34*a* is in parallel with the axis of the refractive index anisotropy of each convex 33*a* of the luminance enhancement film 33, lowering amount of the front luminance elevation resulting from the refractive index anisotropy of each convex 33*a* due to the polarization split function of each convex 34*a* may be minimized.

Figure 6:
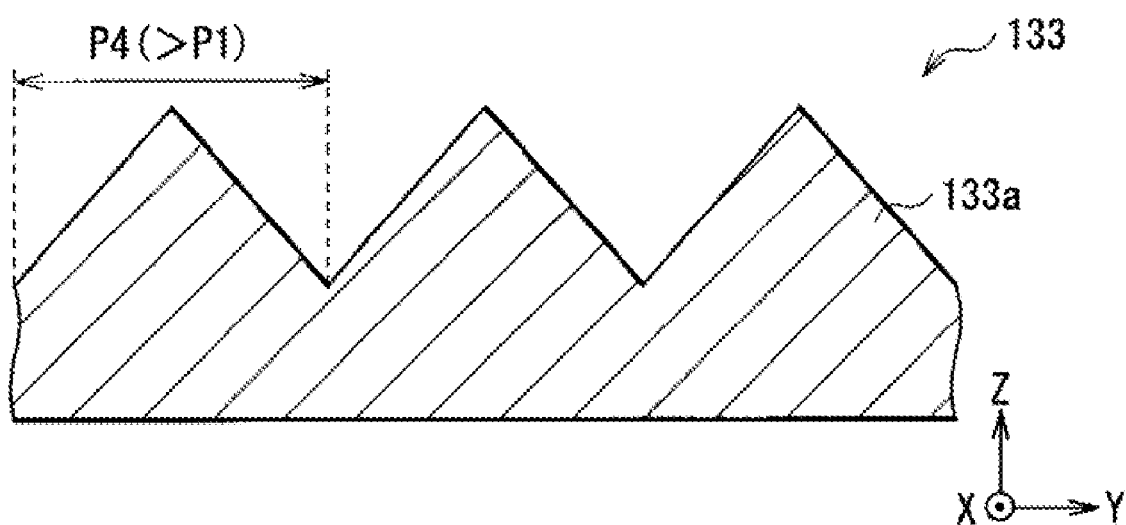
FIG. 6 is a cross section for explaining an example of a method of forming the luminance enhancement film of FIG. 1.
Figure 7A:
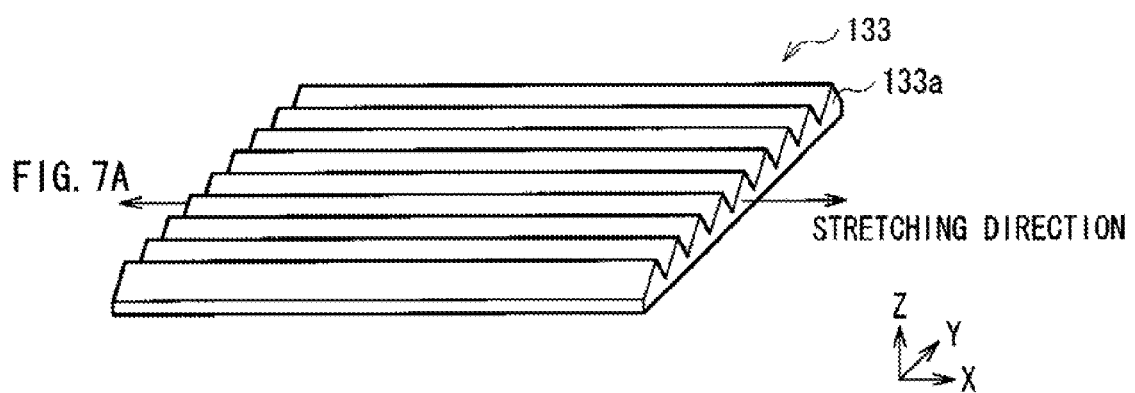
FIGS. 7A and 7B are respectively a perspective view and a cross section for explaining a step following FIG. 6.
Figure 7B:
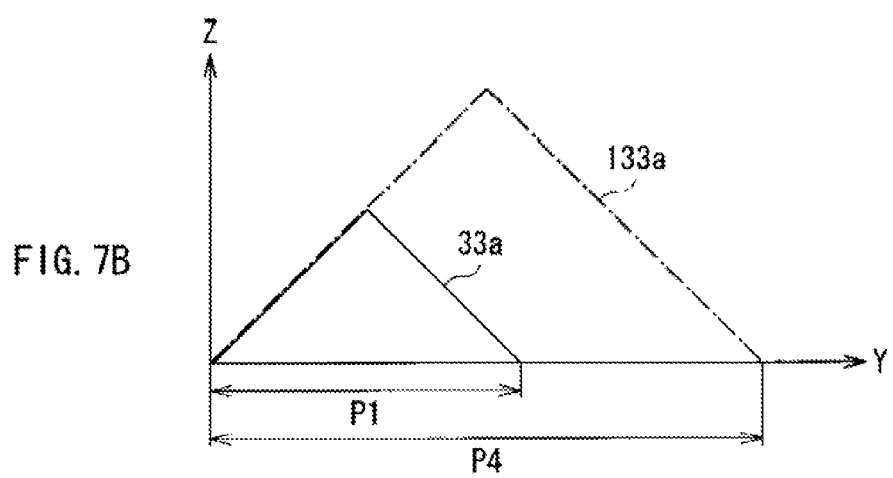

Next, a description will be given of an example of a method of forming the luminance enhancement film 33 with reference to FIG. 6, FIG. 7A, and FIG. 7B. FIG. 6 is a cross sectional structure diagram of an after-mentioned luminance enhancement film 133. FIG. 7A is a perspective view of the luminance enhancement film 133. FIG. 7B is a cross section of the convex 33*a* and a convex 133*a*.

First, a plurality of convexes 133*a* having pitch P4 (>P1) are formed on one face (front face) of a resin film (FIG. 6). Thereby, the luminance enhancement film 133 having the plurality of convexes 133*a* on the front face is formed.

The luminance enhancement film 133 may be formed by, for example, thermal press method, melt extrusion processing method or the like. Further, the luminance enhancement film 133 may be formed by using a flat resin sheet as a base and bonding the plurality of convexes 133*a* on the front face of the resin sheet.

Next, the luminance enhancement film 133 is stretched in the extending direction of the convex 133*a* (FIG. 7A). Thereby, the convex 133*a* is stretched in the stretch section to become the convex 33*a*. If the convex 133*a* contains a semi-crystalline or crystalline resin, the convex 33*a* has the refractive index anisotropy by stretching the convex 133*a*. That is, in the case where the convex 133*a* is stretched once, the convex 33*a* is given the shape anisotropy and the refractive index anisotropy. The refractive index anisotropy has an axis in the direction in parallel with the extending direction or in the direction perpendicular to the extending direction.

As shown in FIG. 7B, the pitch P1 of the convex 33*a* is smaller than the pitch P4 of the convex 133*a*. However, the cross sectional shape in the direction perpendicular to the stretch direction of the convex 33*a* is homothetic to the cross sectional shape of the convex 133*a* before being stretched. That is, it is found as follows. If the luminance enhancement film 133 is stretched in the extending direction of the convex 133*a*, the optical characteristics derived from the cross sectional shape in the direction perpendicular to the stretch direction of the luminance enhancement film 33 after stretching the luminance enhancement film 133 are hardly changed from those of the luminance enhancement film 133 before being stretched. Thereby, the shape of the luminance enhancement film 33 after stretching the luminance enhancement film 133 may be precisely controlled.

The luminance enhancement film 33 can be also formed by, for example, the following method.

Figure 8:
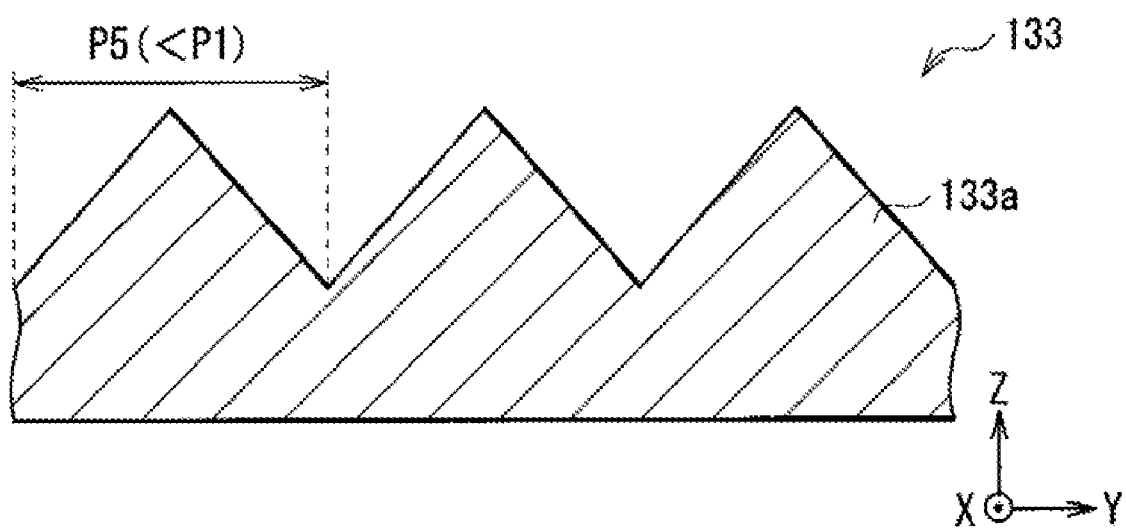
FIG. 8 is a cross section for explaining another example of a method of forming the luminance enhancement film of FIG. 1.
Figure 9A:
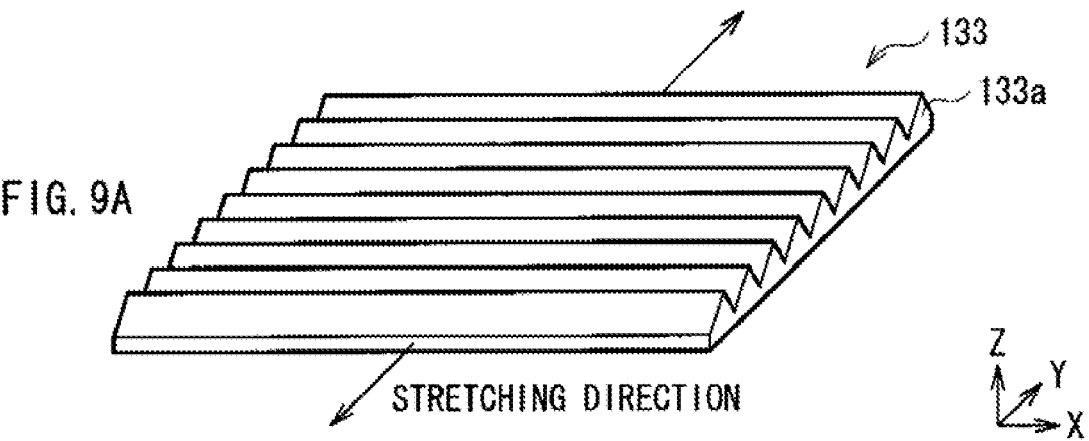
FIGS. 9A and 9B are respectively a perspective view and a cross section for explaining a step following FIG. 8.
Figure 9B:
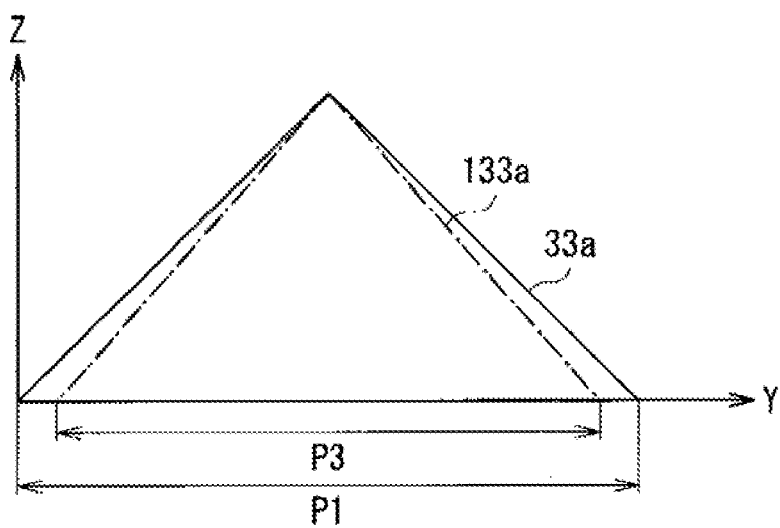

FIG. 8 is a cross sectional structure view of the luminance enhancement film 133. FIG. 9A is a perspective view of the luminance enhancement film 133. FIG. 9B is a cross section of the convex 33a and the convex 133a.

First, the plurality of convexes 133a having pitch P5 (<P1) are formed on one face (front face) of a resin film (FIG. 8). Thereby, the luminance enhancement film 133 having the plurality of convexes 133a on the front face is formed. In this case, the luminance enhancement film 133 may be formed by using a method similar to the foregoing method as well.

Next, the luminance enhancement film 133 is stretched in the direction crossing (perpendicular to) the extending direction of the convex 133a (FIG. 9A). Thereby, the convex 133a is given the refractive index anisotropy, and the convex 33a having the refractive index anisotropy is formed.

As shown in FIG. 9B, the pitch P1 of the convex 33a is larger than the pitch P5 of the convex 133a. Therefore, the cross sectional shape of the convex 33a is the shape obtained by extending the cross sectional shape of the convex 133a in the stretch direction (arrangement direction). That is, it is found as follows. If the luminance enhancement film 133 is stretched in the extending direction of the convex 133a, the optical characteristics of the luminance enhancement film 33 after stretching the luminance enhancement film 133 are slightly changed from those of the luminance enhancement film 133 before being stretched. Thereby, in this case, it is necessary that the shape of the luminance enhancement film 133 before being stretched is formed based on presumption of the shape of the luminance enhancement film 33 after stretching the luminance enhancement film 133.

Figure 10A:
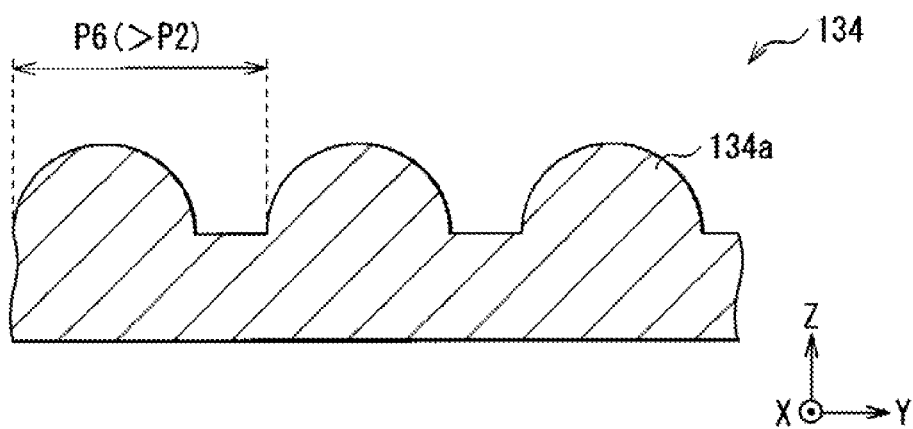
FIGS. 10A and 10B are respectively a cross section and a front face view for explaining an example of a method of forming the anisotropic diffusion sheet of FIG. 1.
Figure 10B:
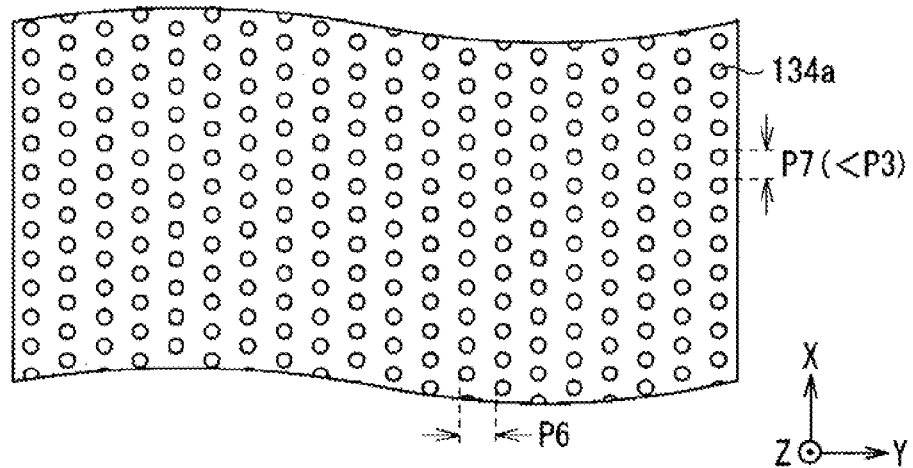
Figure 11A:
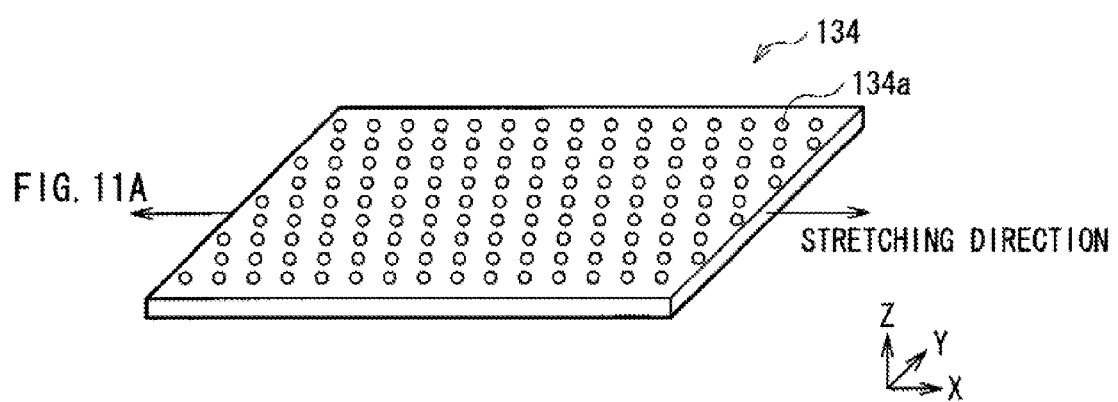
FIGS. 11A and 11B are respectively a perspective view and a cross section for explaining a step following FIGS. 10A and 10B.
Figure 11B:
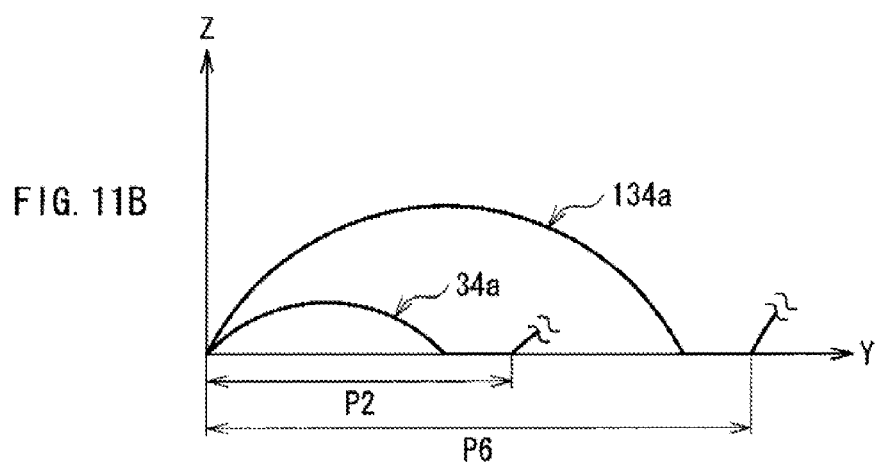

Next, a description will be given of an example of a method of forming the anisotropic diffusion sheet 34 according to this embodiment, with reference to FIGS. 10A, 10B, 11A, and 11B. FIG. 10A is a cross sectional structure view of an aftermentioned anisotropic diffusion sheet 134. FIG. 10B is a plan view of the front face of the anisotropic diffusion sheet 134. FIG. 11A is a perspective view of the anisotropic diffusion sheet 134. FIG. 11B is a cross section of the convex 34a and a convex 134a.

First, on one face (front face) of a resin film, the plurality of convexes 134a having pitch P6 (>P2) are formed in one direction, and the plurality of convexes 134a having pitch P7 (<P3) are formed in the direction crossing (for example, perpendicular to) the one direction (FIGS. 10A and 10B). Thereby, the anisotropic diffusion sheet 134 having the plurality of convexes 134a that are two-dimensionally arranged on the front face is formed. The anisotropic diffusion sheet 134 may be formed by using a method similar to the foregoing method of forming the luminance enhancement film 133.

Next, the anisotropic diffusion sheet 134 is stretched in one direction (FIG. 11A). Thereby, the convex 134a is stretched in the stretch direction to become the convex 34a. If the convex 134a contains a semicrystalline or crystalline resin, the convex 34a has the refractive index anisotropy by stretching the convex 134a. That is, when the convex 134a is stretched once, the convex 34a is given the shape anisotropy and the refractive index anisotropy. The refractive index anisotropy then has an axis in the direction in parallel with the extending direction or in the direction perpendicular to the extending direction.

As shown in FIG. 11B, the pitch P2 in the direction perpendicular to the stretch direction (extending direction) of the convex 34a is smaller than the pitch P6 of the convex 134a. Meanwhile, the pitch P3 in the stretch direction of the convex 34a is larger than the pitch P7 of the convex 134a. However, the cross sectional shape in the direction perpendicular to the stretch direction of the convex 34a is homothetic to the cross sectional shape of the convex 134a before being stretched. That is, it is found as follows. If the anisotropic diffusion sheet 134 is stretched in one direction, the optical characteristics derived from the cross sectional shape in the direction perpendicular to the stretch direction of the anisotropic diffusion sheet 34 after stretching the anisotropic diffusion sheet 134 are hardly changed from those of the anisotropic diffusion sheet 134 before being stretched. Thereby, the shape of the anisotropic diffusion sheet 34 after stretching the anisotropic diffusion sheet 134 may be precisely controlled.

Figure 12:
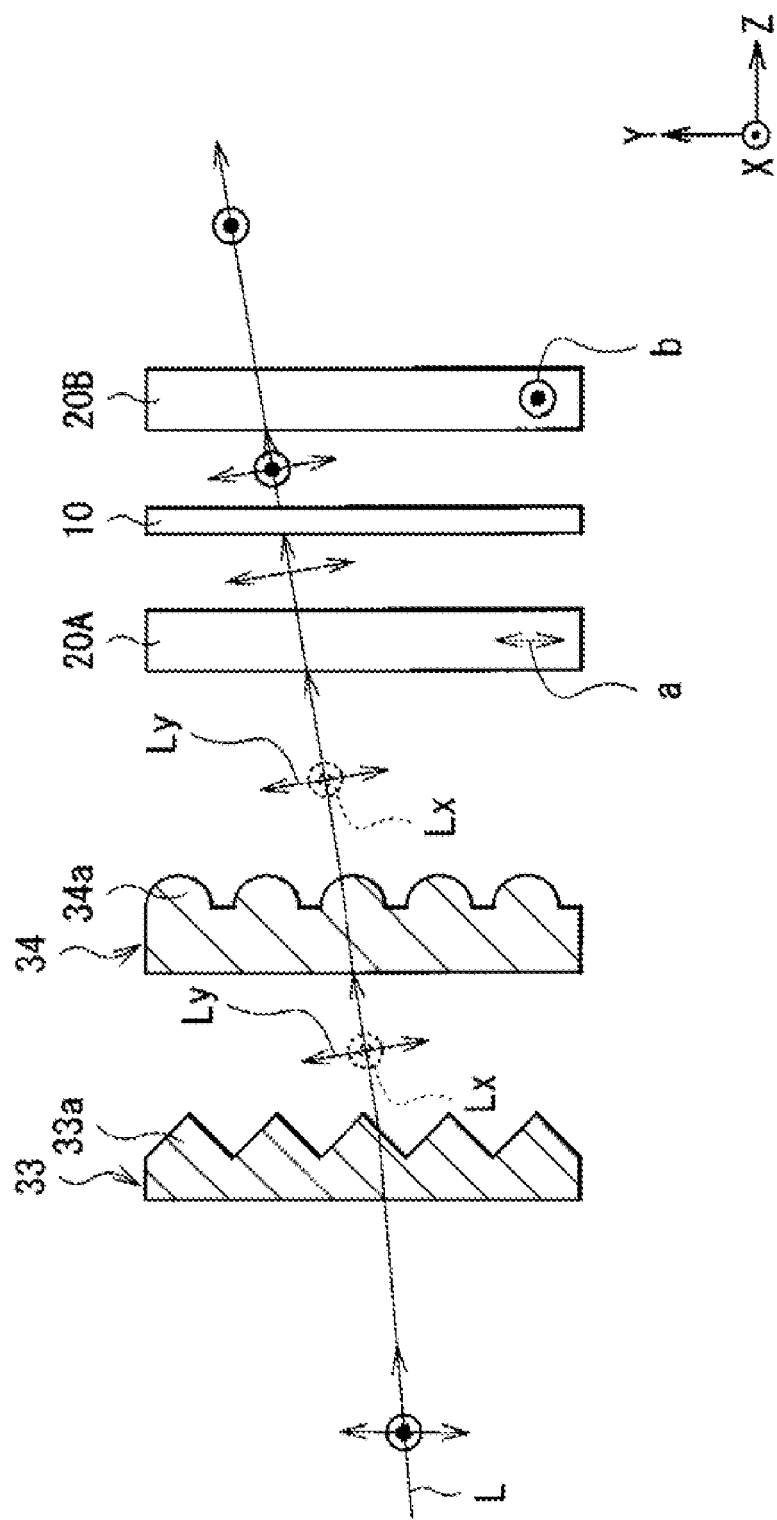
FIG. 12 is a schematic structure view for explaining operations of the display unit of FIG. 1.

Next, a description will be given of basic operations when an image is displayed on the display unit 1 according to this embodiment with reference to FIG. 12. FIG. 12 schematically shows an example of the basic operations of the display unit 1.

Nonpolarized light L that has been emitted from the illuminating device 30 and passed through the diffusion sheet 31 enters the rear face of the luminance enhancement film 33, and its directivity is increased in the convex 33a. Further, the light L is split into a polarization component (Ly in FIG. 12) in parallel with the polarizing axis of the anisotropic diffusion sheet 34 by the action of the convex 33a, and enters the anisotropic diffusion sheet 34.

The light L entered the anisotropic diffusion sheet 34 is diffused in the convex 34a and is split into a polarization component (Ly in FIG. 12) in parallel with the polarizing axis a of the first polarizer 20A by the action of the convex 34a, and enters the first polarizer 20A.

Of the light L entering the first polarizer 20A, a polarization component (Lx in FIG. 12) crossing the polarizing axis a is absorbed by the first polarizer 20A, and a polarization component (Ly in FIG. 12) in parallel with the polarizing axis a passes through the first polarizer 20A. Ly passed through the first polarizer 20A is polarization-controlled in unit of pixel in the liquid crystal display panel 10 and enters the second polarizer 20B. Only polarized light of the polarizing axis b of the second polarizer 12B passes through the second polarizer 20B to form an image on the panel front face. Accordingly, the image is displayed in the display unit 1.

In an embodiment, in the luminance enhancement film 33, as shown in FIG. 2, the plurality of columnar convexes 33a extend in one direction in-plane on the light emitting side, and are sequentially arranged in parallel (one-dimensionally arranged) in the direction crossing the extending direction. Thereby, each convex 33a refracts and transmits the component in the arrangement direction of each convex 33a of the light entering from the rear face side of the luminance enhancement film 33 in the direction perpendicular to the liquid crystal display panel 10 (normal line direction of the luminance enhancement film 33), and thereby improves the directivity. In the result, the front luminance is improved.

Further, in the anisotropic diffusion sheet 34, as shown in FIG. 3A and FIG. 3B, the plurality of convexes 34a extend and are sequentially arranged in parallel in one direction in-plane on the light incident side, and further are arranged in parallel (two-dimensionally arranged) in the direction crossing the extending direction. Thus, the anisotropy is generated in the haze degree resulting from the shape anisotropy. Thereby, it is possible to eliminate lowering of the luminance view angle that is called dark band, cutoff or the like.

In the case that each convex 33a of the luminance enhancement film 33 has the refractive index anisotropy, if the axis of the shape anisotropy of each convex 34a (extending direction) is in parallel with the axis of the refractive index anisotropy of each convex 33a, the axis of the anisotropy of the haze degree resulting from the shape anisotropy of each convex 34a becomes in parallel with the axis of the refractive index anisotropy of each convex 33a. Thereby, the light (polarized light) entering from the rear face side of the anisotropic diffusion sheet 34 passes through the anisotropic diffusion sheet 34 is not depolarized and is emitted from the anisotropic diffusion sheet 34. Therefore, appropriate adjustment of the haze degree minimizes lowering amount of the front luminance elevation resulting from the refractive index anisotropy of each convex 33a due to the diffusion effect of each convex 34a.

Further, in the case that each convex 34a of the anisotropic diffusion sheet 34 has the refractive index anisotropy, if the axis of the refractive index anisotropy of each convex 34a is in parallel with the axis of the refractive index anisotropy of each convex 33a of the luminance enhancement film 33, the polarization split function of each convex 33a is not lowered by the polarization split function of each convex 34a. Thereby, the front luminance is improved resulting from the refractive index anisotropy of each convex 33a, and the front luminance is further improved resulting from the refractive index anisotropy of each convex 34a.

In the case that each convex 33a of the luminance enhancement film 33 does not have the refractive index anisotropy and each convex 34a of the anisotropic diffusion sheet 34 has the refractive index anisotropy, the orientation of the axis of the anisotropy of the haze degree of each convex 34a and the haze degree of each convex 34a are preferably set so that the elevation amount of the front luminance resulting from the refractive index anisotropy of each convex 34a is larger than the lowering amount of the front luminance resulting from the haze degree of each convex 34a. Thereby, the front luminance elevated in the luminance enhancement film 33 may be inhibited from being lowered in the anisotropic diffusion sheet 34 to the minimum, or such lowering may be eliminated.

As described above, in this embodiment, rapid lowering of the luminance view angle may be eliminated while minimizing the lowering amount of the front luminance, or while the front luminance is not lowered.

EXAMPLES

Figures 13, 14:
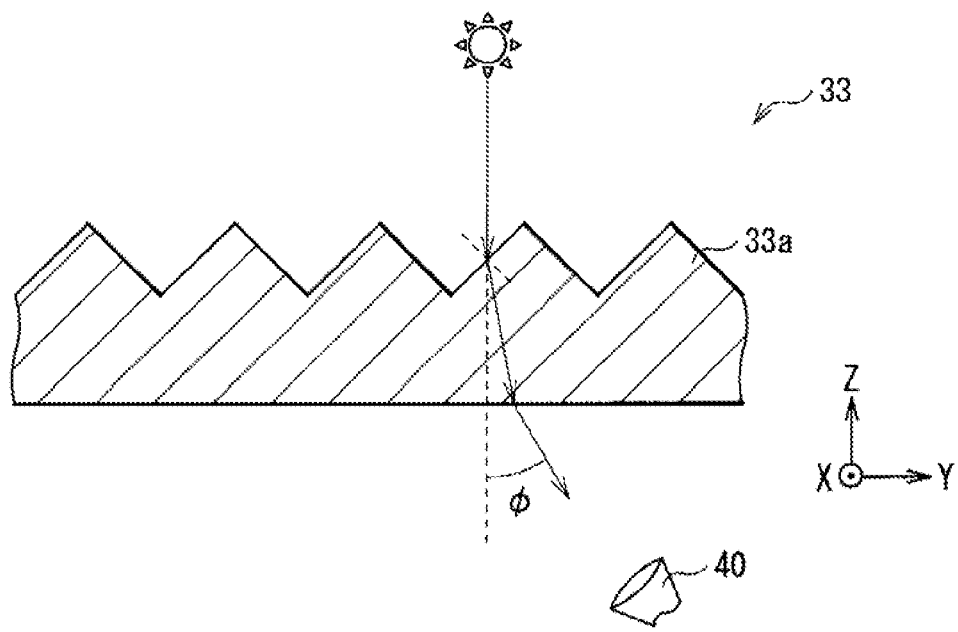
FIG. 13 is a contrast diagram for explaining combinations of the luminance enhancement film and the anisotropic diffusion sheet in Examples and Comparative examples.
FIG. 14 is a conceptual diagram for explaining an example of a method for measuring birefringence.

A description will be given of Examples 1 and 2 of the display unit 1 according to the foregoing embodiment in contrast with Comparative examples 1 to 6. In Examples 1 and 2 and Comparative examples 1 to 6, combinations of the luminance enhancement film and the anisotropic diffusion sheet are different from each other. Specifically, the combinations are as shown in FIG. 13. In FIG. 13, "NOT STRETCHED (133)" indicates the luminance enhancement film 133 described in the foregoing embodiment, and "STRETCHED (33)" indicates the luminance enhancement film 33 described in the foregoing embodiment. "NOT STRETCHED (134)" indicates the anisotropic diffusion sheet 134 described in the foregoing embodiment, and "STRETCHED (34)" indicates the anisotropic diffusion sheet 34 described in the foregoing embodiment.

First, a description will be given of respective methods of forming the luminance enhancement film 133, the luminance enhancement film 33, the anisotropic diffusion sheet 134, and the anisotropic diffusion sheet 34. After that, a description will be given of respective optical characteristics of the luminance enhancement film 133, the luminance enhancement film 33, the anisotropic diffusion sheet 134, and the anisotropic diffusion sheet 34. Lastly, a description will be given of results of Examples 1 and 2 and Comparative examples 1 to 6.

[Method of Forming Luminance Enhancement Film 133 and Luminance Enhancement Film 33]

A metal emboss original plate for thermal press for transferring the convex 133a to a resin film was prepared. On the front face of the original plate, a concavo-convex shape in which a plurality of isosceles triangle poles having an apex angle of 90 degrees and an base angle of 45 degrees are sequentially arranged in parallel with a pitch of 50 μm are carved. As the resin film, an A-PEN (amorphous PEN) sheet (Tg: about 120 deg C.) being 200 μm thick that is a kind of a thermoplastic resin was used. A-PEN is a material that shows the refractive index anisotropy in which the refractive index in the stretch direction is larger than the refractive index in the direction perpendicular to the stretch direction when A-PEN is stretched. A-PEN itself does not have the refractive index anisotropy.

Further, the foregoing resin film was sandwiched between the metal emboss original plate and a metal flat original plate, and pressed under the thermal press conditions of 150 deg C., 10 minutes, and 100 kgf/cm$^2$ (9.8 MPa). Immediately after that, the resultant was put into ice water and cured. Accordingly, the convex 133a was transferred to the front face of the resin film. The luminance enhancement film 133 obtained as above was not stretched in the course of manufacturing, and thus did not have the refractive index anisotropy.

Next, the luminance enhancement film 133 was cut into a rectangle being 8 cm long (extending direction of the convex 133a) and 5 cm wide (direction perpendicular to the extending direction of the convex 133a). After that, the both ends of the longitudinal direction were zipped by a manual stretch machine, and the luminance enhancement film 133 was uniaxially stretched in the longitudinal direction at a stretch rate of 1 cm/sec under the environment of 140 deg C., so that the center of the luminance enhancement film 133 became 3.5 times as large as the original size. Thereby, the convex 133a was stretched, and the convex 33a having the refractive index anisotropy was formed. The luminance improvement film 33 obtained as above had the refractive index anisotropy in addition to the shape anisotropy.

[Homothetic Cross Sectional Shape]

Cross sections in the arrangement direction of the luminance enhancement film 133 and the luminance enhancement film 33 were measured by using a surface roughness measure (Surfcorder ET4001A, manufactured by Kosaka Laboratory Ltd.). In the result, the cross sections of the luminance enhancement film 133 and the luminance enhancement film 33 were respectively in the shape of isosceles right triangle having the same apex angle of 90 degrees and the same base angle of 45 degrees as the concavo-convex shape of the metal emboss original plate, and were homothetic to each other. Further, while the convex 133a of the luminance enhancement film 133 before being stretched had the same pitch of about 50 μm as that of the original plate, the convex 33a of the luminance enhancement film 33 after stretching the luminance enhancement film 133 had a narrower pitch of about 26.7 μm.

[Birefringence]

Figure 15:
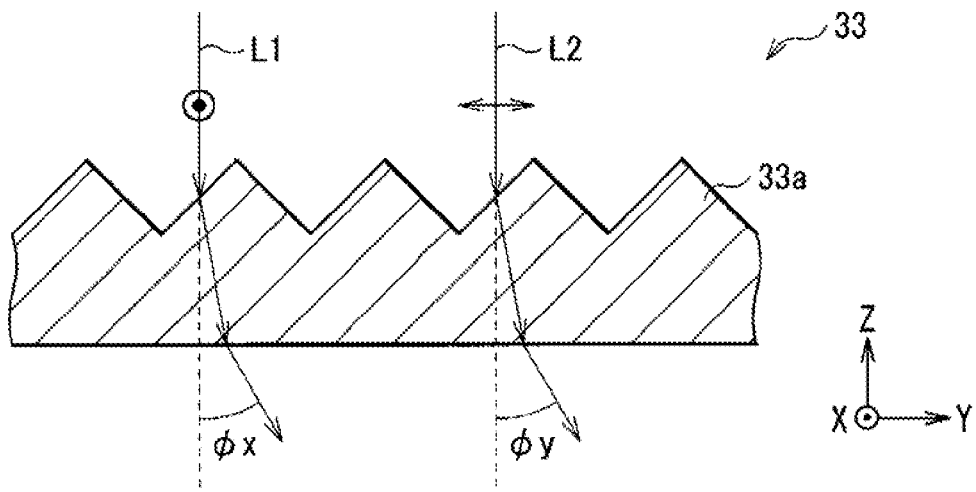
FIG. 15 is a conceptual diagram for explaining a polarizing axis of the birefringence.
Figure 16:
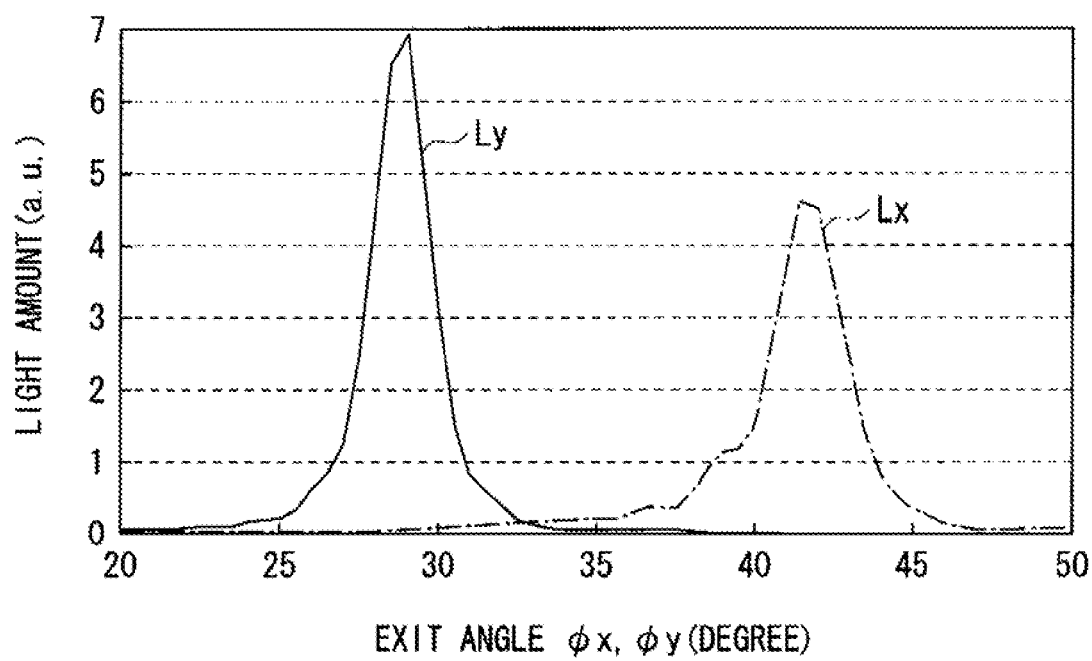
FIG. 16 is a relation diagram for showing a relation between an exit angle of the luminance enhancement film and a light amount.

Next, the birefringence of the luminance enhancement film 33 was measured. To measure the birefringence, as shown in FIG. 14, polarized light was perpendicularly entered from the convex 33a side of the luminance enhancement film 33, the transmitted light was detected by a measure 40, and difference Δ (=nx−ny) between the refractive index nx in the extending direction of the convex 33a and the refractive index ny in the arrangement direction of the convex 33a was calculated based on the difference of the exit angle φ of the transmitted light. As shown in FIG. 15, where the polarization component oscillating in the extending direction of the convex 33a was the perpendicular polarized light Lx, and the polarization component oscillating in the arrangement direction of the convex 33a was the horizontal polarized light Ly, as shown in FIG. 16, the exit angle φx of the perpendicular polarized light Lx was larger than the exit angle φy of the horizontal polarized light Ly. The unit (a.u.) of the vertical axis of FIG. 16 represents arbitrary unit, and means a "relative value."

As a result of the measurement, the refractive index nx in the extending direction of the luminance enhancement film 33 was 1.79, and the refractive index ny in the arrangement direction was 1.56. Thus, the difference between the refractive indices Δn was 0.23. Accordingly, by thermally pressing the A-PEN sheet to form the convex 33a and then uniaxially stretching the result, a light transmissive film having the different refractive indices between in the extending direction of the convex 33a and in the arrangement direction of the convex 33a was obtained. Further, as shown in FIG. 16, it is confirmed that the transmittance of the horizontal polarized light Ly was higher than that of the perpendicular polarized light Lx. That resulted from the following fact. The refractive index nx of the luminance enhancement film 33 in the extending direction of the convex 33a was larger than the refractive index ny of the luminance enhancement film 33 in the arrangement direction of the convex 33a. Thus, the total reflection effect on the light emitting face of the convex 33a and on the light incident face of the luminance enhancement film 33 of the perpendicular polarized light Lx in parallel with the extending direction of the convex 33a became high, and the transmitted light amount thereof was lowered compared to that of the horizontal polarized light Ly.

[Method of Forming Anisotropic Diffusion Sheet 134 and Anisotropic Diffusion Sheet 34]

A metal convex original plate for thermal press for transferring the convex 134a to a resin film was prepared. On the front face of the original plate, a concavo-convex shape was formed. The concavo-convex shape was provided with sandblast processing so that Sra was 2 μm and the haze degree was in the range from 50 to 60%. As the resin film, as in the case of the luminance enhancement film 133 and the luminance enhancement film 33, an A-PEN (amorphous PEN) sheet (Tg: about 120 deg C.) being 200 μm thick was used.

Figure 17A:
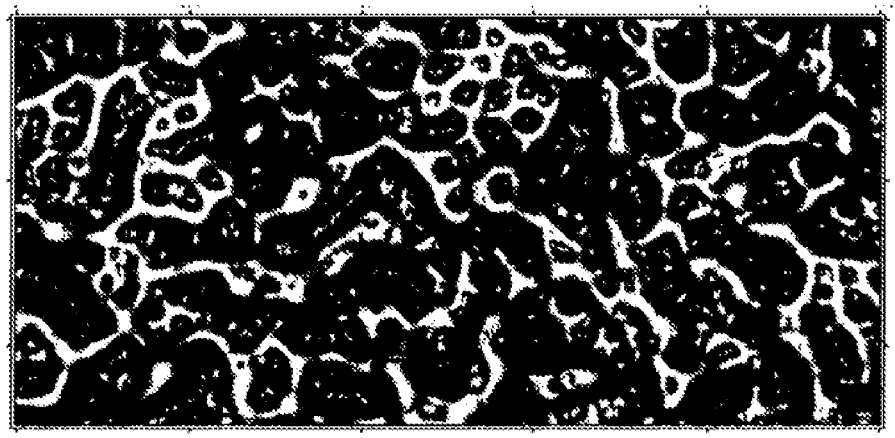
FIGS. 17A and 17B are plan views for explaining a front face shape of the anisotropic diffusion sheet before and after being stretched.

The foregoing resin film was sandwiched between the metal emboss original plate and a metal flat plate, and pressed under the thermal press conditions of 150 deg C., 10 minutes, and 100 kgf/cm² (9.8 MPa). Immediately after that, the resultant was put into ice water and cured. Accordingly, the convex 134a was transferred to the front face of the resin film. A state of the front face of the resin film to which convex 134a was transferred is shown in FIG. 17A. The anisotropic diffusion sheet 134 obtained as above was not stretched in the course of manufacturing. Thus, the anisotropic diffusion sheet 134 had the shape anisotropy but did not have the refractive index anisotropy.

Figure 17B:
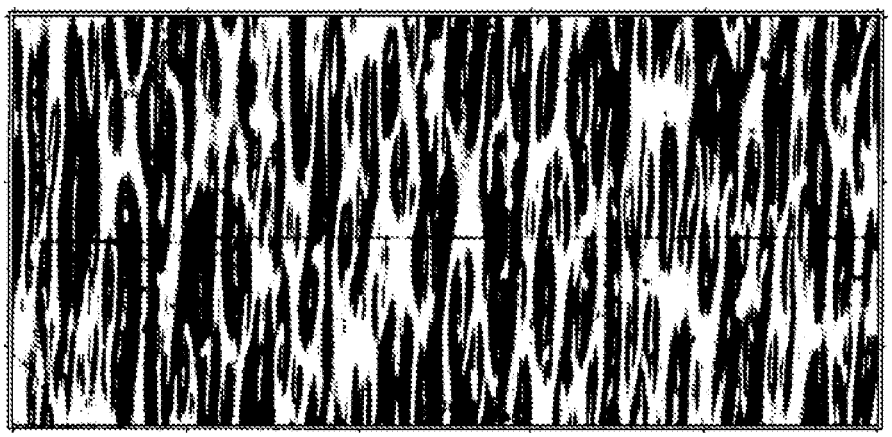

Next, the anisotropic diffusion sheet 134 was cut into a rectangle being 8 cm long and 5 cm wide. After that, the both ends in the longitudinal direction were zipped by a manual stretch machine. The anisotropic diffusion sheet 134 was uniaxially stretched in the longitudinal direction at a stretch rate of 1 cm/sec under the environment of 140 deg C., so that the center of the anisotropic diffusion sheet 134 was stretched 3.5 times as large as the original size. Thereby, the convex 134a was stretched in one direction, and the convex 34a having the refractive index anisotropy was formed. The anisotropic diffusion sheet 34 obtained as above had the refractive index anisotropy in addition to the shape anisotropy. A state of the front face of the resin film after the convex 134a was extended in one direction is shown in FIG. 17B.

[Shape Anisotropy]

Further, the front faces of the anisotropic diffusion sheet 134 and the anisotropic diffusion sheet 34 obtained as above were measured by using a surface roughness measure (Surfcorder ET4001A; manufactured by Kosaka Laboratory Ltd.). In the result, when the convex 134a of the anisotropic diffusion sheet 134 before being stretched was compared to the convex 34a of the anisotropic diffusion sheet 34 after stretching the anisotropic diffusion sheet 134, the convex 34a was in the shape obtained by stretching the convex 134a.

[Anisotropy of Haze Degree]

Further, a haze degree difference due to the polarizing axis between the anisotropic diffusion sheet 134 and the anisotropic diffusion sheet 34 was measured by using HAZE METER HM-150 (manufactured by Murakami Color Research Laboratory). In the result, as shown in FIG. 18, the anisotropic diffusion sheet 134 did not show the anisotropy in the haze degree, but the anisotropic diffusion sheet 34 showed the anisotropy in the haze degree.

[Birefringence]

Next, the birefringence of the anisotropic diffusion sheet 34 was measured. In the result, as in the case of the luminance enhancement film 33, the refractive index nx in the extending direction of the anisotropic diffusion sheet 34 was 1.79, and the refractive index ny in the arrangement direction of the anisotropic diffusion sheet 34 was 1.56. Thus, the difference between the refractive indices Δn was 0.23. Further, it was confirmed that the transmittance of the horizontal polarized light Ly was higher than that of the perpendicular polarized light Lx.

[Diffusion Distribution]

Figure 19A:
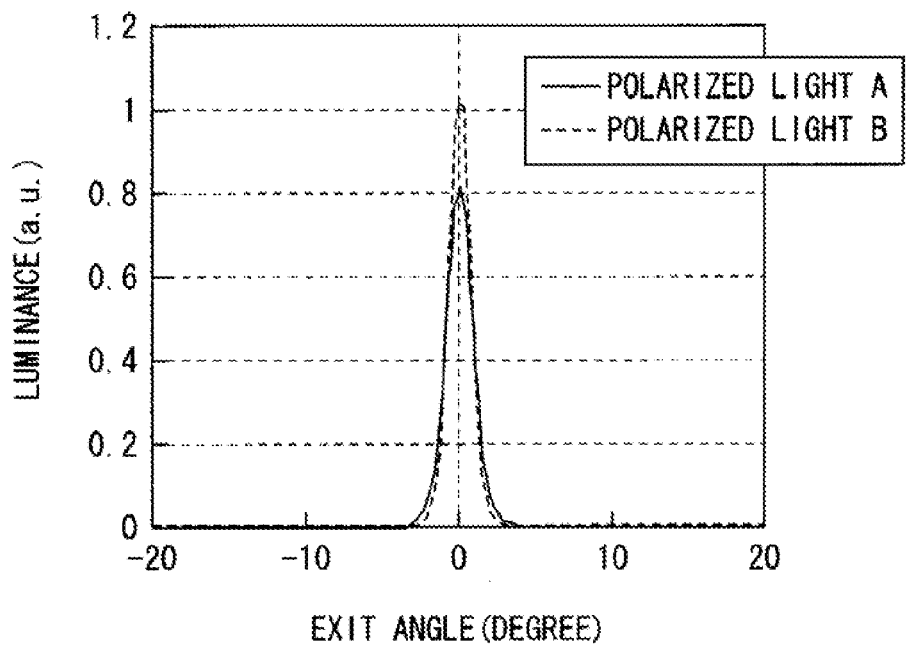
FIGS. 19A and 19B are distribution diagrams for explaining diffusion distribution of the anisotropic diffusion sheet after being stretched.
Figure 19B:
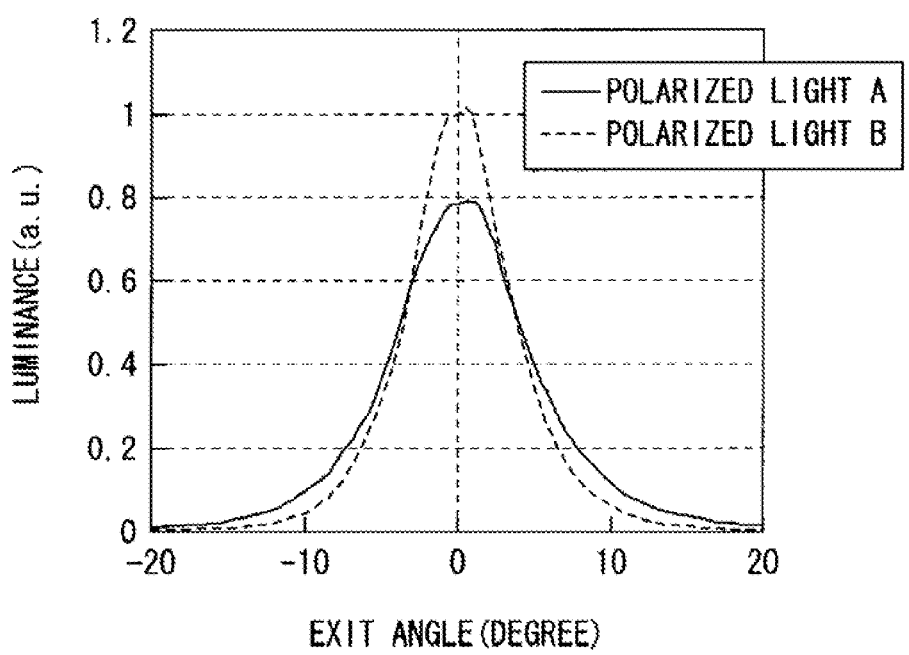
Figure 20A:
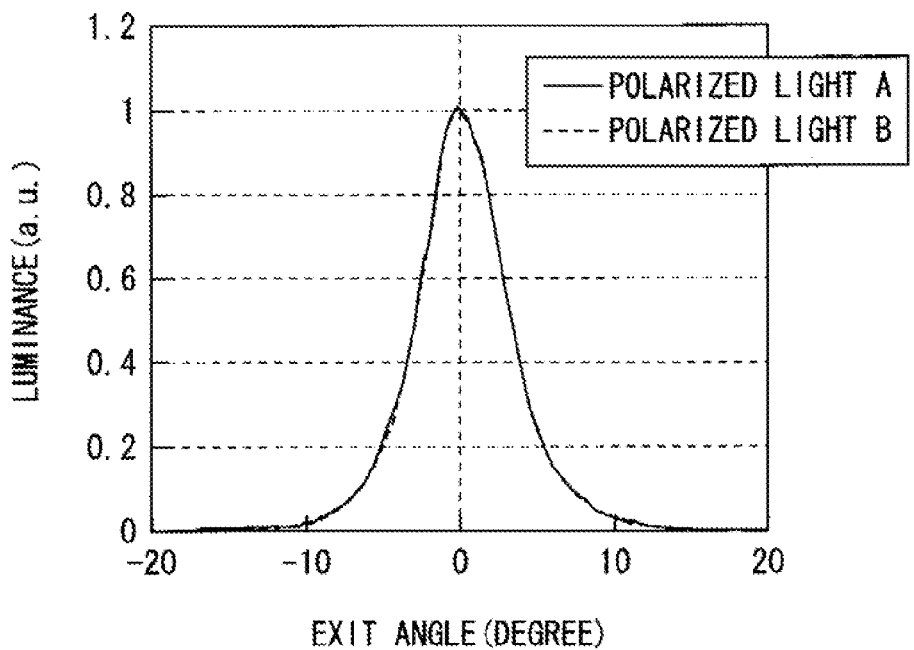
FIGS. 20A and 20B are distribution diagrams for explaining diffusion distribution of the anisotropic diffusion sheet before being stretched.
Figure 20B:
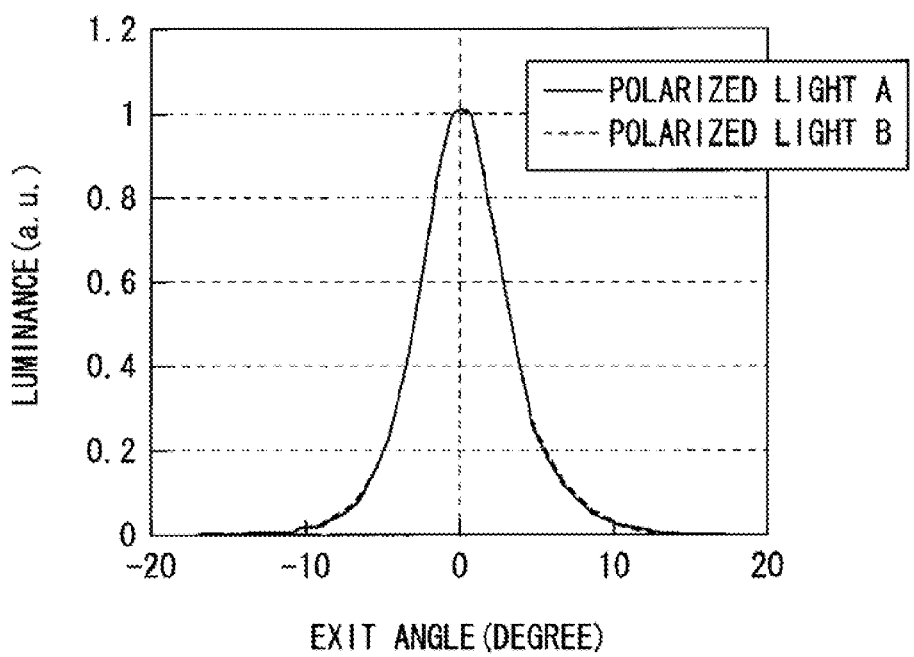

Next, the diffusion distributions of the anisotropic diffusion sheet 134 and the anisotropic diffusion sheet 34 were measured. Specifically, light was perpendicularly entered to the anisotropic diffusion sheet 134 or the anisotropic diffusion sheet 34. For polarized light A and polarized light B of light passing through the anisotropic diffusion sheet 134 or the anisotropic diffusion sheet 34, the diffusion distribution was measured. The polarized light A represents light polarized in the extending direction of the convex 34a or in one direction of the convex 134a. The polarized light B represents light polarized in the direction perpendicular to the polarized light A. FIGS. 19A and 20A show the diffusion distribution on plane face a of the diffusion distribution of the light passing through the anisotropic diffusion sheet 134 or the anisotropic diffusion sheet 34. FIGS. 19B and 20B show the diffusion distribution on plane face β of the diffusion distribution of the light passing through the anisotropic diffusion sheet 134 or the anisotropic diffusion sheet 34. Results of the anisotropic diffusion sheet 34 are shown in FIGS. 19A and 19B and results of the anisotropic diffusion sheet 134 are shown in FIGS. 20A and 20B. The plane face a represents a plane face in parallel with the extending direction of the convex 34a or one direction of the convex 134a, and in parallel with the normal line of the anisotropic diffusion sheet. The plane face a represents a plane face in parallel with a direction perpendicular to the extending direction of the convex 34a or one direction of the convex 134a, and in parallel with the normal line of the anisotropic diffusion sheet.

From FIGS. 19A and 19B, it is found that the light passing through the anisotropic diffusion sheet 34 had the diffusion distribution corresponding to the anisotropy of the haze degree resulting from the shape anisotropy of each convex 34a, and had the luminance level corresponding to the refractive index anisotropy of each convex 34a. Further, from FIGS.

20A and 20B, it is found that the light passing through the anisotropic diffusion sheet 134 did not have both the shape anisotropy (anisotropy of haze degree) and the refractive index anisotropy.

Next, a description will be given of various results (front luminance, illuminance, alignment luminance, and cutoff) of Examples 1 and 2 and Comparative examples 1 to 6.

Figures 21, 22, 23:
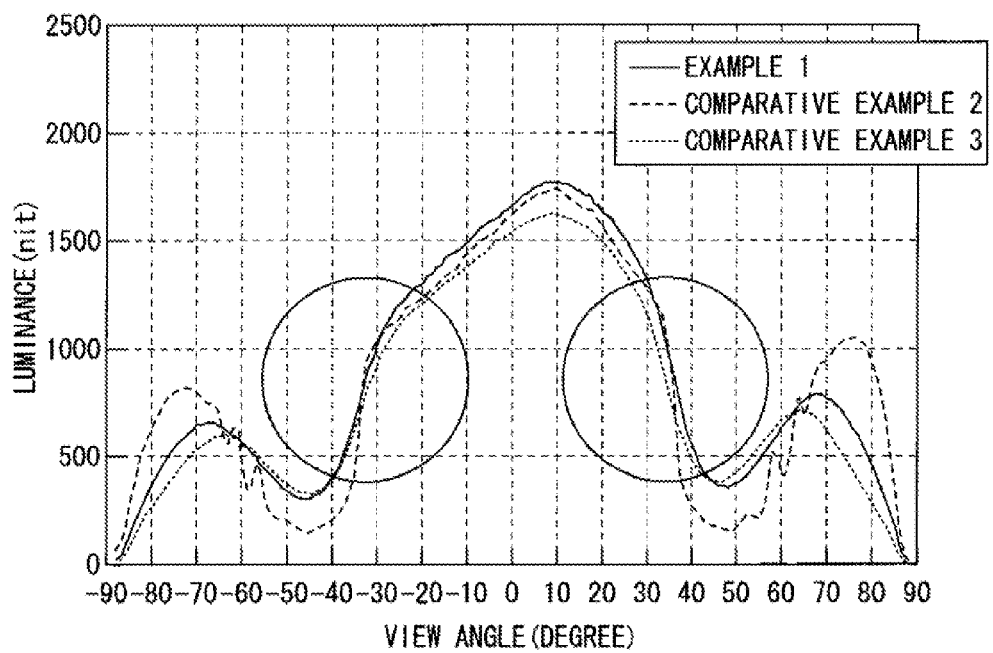
FIG. 21 is a contrast diagram for explaining front luminance and the like in Comparative examples 1 and 4.
FIG. 22 is a contrast diagram for explaining front luminance and the like in Example 1 and Comparative examples 2 to 3.
FIG. 23 is a relation diagram for showing a relation between a view angle and luminance in Example 1 and Comparative examples 2 to 3.

First, in the anisotropic diffusion sheet 134 (Comparative example 1) and the anisotropic diffusion sheet 34 (Comparative example 4), the front luminance and the illuminance were respectively measured. Specifically, an edge light type backlight unit having a light source, a reflective plate, and a light guide plate was used. On the light guide plate, the diffusion sheet 32, the anisotropic diffusion sheet 34 or the anisotropic diffusion sheet 134, and the first polarizer 20A were sequentially arranged from the backlight unit side. The front luminance and the illuminance of light emitted from the first polarizer 20A were measured by using a luminance colorimeter (EZ-contrastXL88, manufactured by ELDIM Co.). The results are shown in FIG. 21. From FIG. 21, it was found that both the front luminance and the illuminance of the anisotropic diffusion sheet 34 were more superior to those of the anisotropic diffusion sheet 134.

Next, in the case that the combination of the luminance enhancement film 133 and the anisotropic diffusion sheet 34 was used (Example 1), the case that only the luminance enhancement film 133 was used (Comparative example 2), and the case that the combination of the luminance enhancement film 133 and the anisotropic diffusion sheet 134 was used (Comparative example 3), the front luminance, the illuminance, and the alignment luminance were respectively measured. Specifically, a backlight unit similar to the foregoing backlight unit was used. On the light guide plate, the diffusion sheet 32, the luminance enhancement film 133, the anisotropic diffusion sheet 34 or the anisotropic diffusion sheet 134, and the first polarizer 20A were sequentially arranged from the backlight unit side. The front luminance and the illuminance of light emitted from the first polarizer 20A were measured by using a luminance colorimeter (EZ-contrastXL88, manufactured by ELDIM Co. make). In the case of Comparative example 2, nothing was inserted between the luminance enhancement film 133 and the first polarizer 20A. The results are shown in FIGS. 22 and 23.

In FIG. 22, "not recognizable" in the cutoff level column represents a case that intense change of the luminance view angle was not able to be determined or hardly determined visually; and "recognizable" in the cutoff level column represents a case that intense change of the luminance view angle was able to be determined or easily determined visually. In FIG. 23, a region surrounded by a large circle corresponds to a region where a cutoff is easily generated. In the visual examination, whether or not a cutoff is generated in such a region was mainly determined. A region surrounded by a large circle in FIG. 25 is similar to that of FIG. 23.

From FIGS. 22 and 23, it was found that in Example 1, the higher front luminance and the higher illuminance were maintained compared to Comparative examples 2 and 3, and the cutoff was suppressed as well.

Next, in the case that the combination of the luminance enhancement film 33 and the anisotropic diffusion sheet 34 was used (Example 2), the case that only the luminance enhancement film 33 was used (Comparative example 5), and the case that the combination of the luminance enhancement film 33 and the anisotropic diffusion sheet 134 was used (Comparative example 6), the front luminance, the illuminance, and the orientational luminance were respectively measured. Specifically, a backlight unit similar to the foregoing backlight unit was used. On the light guide plate, the diffusion sheet 32, the luminance enhancement film 33, the anisotropic diffusion sheet 34 or the anisotropic diffusion sheet 134, and the first polarizer 20A were sequentially arranged from the backlight unit side. The front luminance and the illuminance of light emitted from the first polarizer 20A were measured by using a luminance colorimeter (EZ-contrastXL88, manufactured by ELDIM Co.). In the case of Comparative example 5, nothing was inserted between the luminance enhancement film 33 and the first polarizer 20A. The results are shown in FIGS. 24 and 25.

Figures 24, 25:
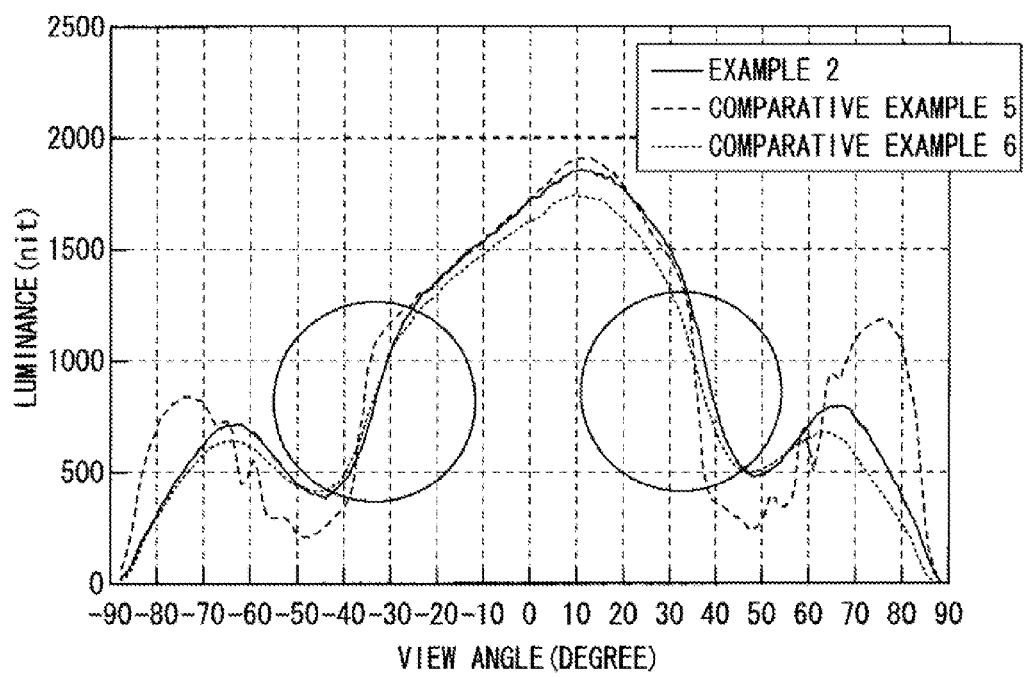
FIG. 24 is a contrast diagram for explaining front luminance and the like in Example 2 and Comparative examples 5 to 6.
FIG. 25 is a relation diagram for showing a relation between a view angle and luminance in Example 2 and Comparative examples 5 to 6.

From FIGS. 24 and 25, it was found that in Example 2, the higher front luminance and the higher illuminance were maintained compared to Comparative examples 5 and 6, and the cutoff was suppressed as well.

While the present application has been described with reference to the embodiment and the examples, the present application is not limited to the embodiment and the like, and various modifications may be made.

For example, in the foregoing embodiment and the like, one piece of the luminance enhancement film 33 was used. However, a lamination composed of two pieces of the luminance enhancement film 33 may be used. In this case, it is desirable that arrangement is made so that the extending direction of the convex 33a of the upper sheet is perpendicular to that of the lower sheet. It is also desirable that one luminance enhancement film 33 has the higher refractive index of the luminance enhancement film 33 in the extending direction of the convex 33a, and the other luminance enhancement film 33 has the higher refractive index of the luminance enhancement film 33 in the arrangement direction of the convex 33a.

In the foregoing embodiment and the like, the structure of the liquid crystal display unit has been illustratively described. However, it is not necessary to provide all layers. In addition, other layer may be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display unit comprising:
  a panel driven based on an image signal;
  a pair of polarizers sandwiching the display panel;
  a light source for illuminating the panel; and
  an optical sheet provided between the polarizer and the light source,
  wherein the optical sheet is formed by layering a first light transmissive film and a second light transmissive film in this order from the light source side,
  the first light transmissive film has a plurality of first convexes that extend in a given direction and are arranged in parallel in a direction crossing the given direction in-plane on the second light transmissive film side, and
  the second light transmissive film has a plurality of second convexes that are arranged in parallel in one direction and are arranged in parallel in a direction crossing the one direction in-plane on the first light transmissive film side, and has shape anisotropy and refractive index anisotropy in-plane, wherein a direction having the smallest refractive index in the second convex is in parallel with a direction of a light transmission axis of the polarizer on the light source side, or crosses the direction of a light transmission axis of the polarizer in the range of from more than 0 degree to less than 45 degrees.

2. The display unit according to claim 1, wherein the respective second convexes are in a columnar shape extending in the one direction, and a refractive index in an extending direction of the respective second convexes is larger than a refractive index in a direction crossing the extending direction of the respective second convexes.

3. The display unit according to claim 2, wherein the respective second convexes are formed by being stretched in the one direction.

4. The display unit according to claim 2, wherein the respective second convexes contain a semicrystalline or crystalline resin.

5. The display unit according to claim 1, wherein the respective first convexes have refractive index anisotropy in-plane.

6. The display unit according to claim 5, wherein a refractive index in an extending direction of the respective first convexes is larger than a refractive index in a direction crossing the extending direction of the respective first convexes.

7. The display unit according to claim 6, wherein the respective second convexes are in a columnar shape extending in the one direction, and a refractive index in an extending direction of the respective second convexes is larger than a refractive index in a direction crossing the extending direction of the respective second convexes.

8. The display unit according to claim 7, wherein the extending direction of the second convex is in parallel with or in almost parallel with the extending direction of the first convex.

* * * * *